United States Patent
Datta et al.

(10) Patent No.: US 11,604,448 B2
(45) Date of Patent: Mar. 14, 2023

(54) ELECTRIC POWER GRID INSPECTION AND MANAGEMENT SYSTEM

(71) Applicant: PACIFIC GAS AND ELECTRIC COMPANY, San Francisco, CA (US)

(72) Inventors: Kunal Datta, San Francisco, CA (US); Tony Chen, San Francisco, CA (US); Marcella Kwan, San Francisco, CA (US); Patrick Buckles, San Ramon, CA (US); Michael James Locatelli, Pittsburg, CA (US); Teresa Alapat, Walnut Creek, CA (US); Maria Joseph, San Francisco, CA (US); Michael S. Glass, Oakland, CA (US); Jonathan Mello, El Cerrito, CA (US); Khushar Faizan, Walnut Creek, CA (US); Xiwang Li, El Cerrito, CA (US)

(73) Assignee: PACIFIC GAS AND ELECTRIC COMPANY, San Francisco, CA (US)

( * ) Notice: Subject to any disclaimer, the term of this patent is extended or adjusted under 35 U.S.C. 154(b) by 82 days.

(21) Appl. No.: 16/942,060

(22) Filed: Jul. 29, 2020

(65) Prior Publication Data
US 2021/0034027 A1    Feb. 4, 2021

Related U.S. Application Data

(60) Provisional application No. 62/880,043, filed on Jul. 29, 2019.

(51) Int. Cl.
*G05B 19/048* (2006.01)
*G06N 20/00* (2019.01)

(52) U.S. Cl.
CPC ........... *G05B 19/048* (2013.01); *G06N 20/00* (2019.01); *G05B 2219/2639* (2013.01)

(58) Field of Classification Search
CPC .............................. G05B 19/048; G06N 20/00
USPC ................................................... 700/286–298
See application file for complete search history.

(56) References Cited

U.S. PATENT DOCUMENTS

| | | | |
|---|---|---|---|
| 2017/0207926 A1* | 7/2017 | Gil | H04L 12/282 |
| 2018/0046910 A1* | 2/2018 | Greene | G06N 3/08 |
| 2018/0262525 A1* | 9/2018 | Yan | H04L 63/1425 |
| 2019/0041845 A1* | 2/2019 | Celia | H04L 67/1097 |

(Continued)

OTHER PUBLICATIONS

Rafique, Syed Furqan, et al. "Design and implementation of a UAV for power system utility inspection." 2014 16th International Power Electronics and Motion Control Conference and Exposition. IEEE, 2014.pp. 1146-1150. (Year: 2014).*

(Continued)

*Primary Examiner* — Satish Rampuria
(74) *Attorney, Agent, or Firm* — Greenberg Traurig, LLP

(57) ABSTRACT

In some embodiments, the system is directed to an autonomous inspection system for electrical grid components. In some embodiments, the system collects electrical grid component data using an autonomous drone and then transmits the inspection data to one or more computers. In some embodiments, the system includes artificial intelligence that analysis the data and identifies electrical grid components defects and provides a model highlighting the defects to a user. In some embodiments, the system enables a user to train the artificial intelligence by providing feedback for models where defects or components are not properly identified.

18 Claims, 40 Drawing Sheets

(56) References Cited

U.S. PATENT DOCUMENTS

| | | | | |
|---|---|---|---|---|
| 2019/0128771 A1* | 5/2019 | Santarone | ............ | G02B 27/017 |
| 2019/0382111 A1* | 12/2019 | Schwartz | .............. | B64C 39/024 |
| 2020/0026253 A1* | 1/2020 | Fuhr | ..................... | H04L 9/3239 |
| 2021/0000347 A1* | 1/2021 | Stump | ...................... | A61B 5/11 |

OTHER PUBLICATIONS

Morgenthal, G., and N. Hallermann. "Quality assessment of unmanned aerial vehicle (UAV) based visual inspection of structures." Advances in Structural Engineering 17.3 (2014): pp. 289-302. (Year: 2014).*
Hrabar, Stefan, Torsten Merz, and Dennis Frousheger. "Development of an autonomous helicopter for aerial powerline inspections." 2010 1st International Conference on Applied Robotics for the Power Industry. IEEE, 2010.pp. 1-6. (Year: 2010).*
Grigorescu, Sorin, et al. "A survey of deep learning techniques for autonomous driving." Journal of Field Robotics 37.3 (2020): 99. pp. 362-386. (Year: 2020).*
Ahmadian, Navid, et al. "A Novel Power Distribution Network Assessment Approach Using Drones Considering Wireless Charging." IEEE Systems Journal (2021).pp. 3894-3904 (Year: 2021).*
Gudmundsson, Ingi, and Gregory Falco. "Porting Computer Vision Models to the Edge for Smart City Applications: Enabling Autonomous Vision-Based Power Line Inspection at the Smart Grid Edge for Unmanned Aerial Vehicles (UAVs)." HICSS. 2022.pp. 1-11 (Year: 2022).*

\* cited by examiner

FIG. 1
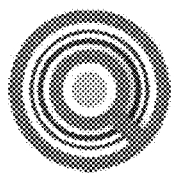
Sherlock Suite
*A.I. Powered Drone Inspections. At Scale.*
*Safer. Better. Faster. Cheaper. More auditable.*

Sherlock

Today: Inspectors using Sherlock

| Date | Inspectors | Structures |
|------|-----------|------------|
| 3/18 | 3 | 10 |
| 4/18 | 21 | 87 |
| 5/15 | 84 | s Prob 766/889 |
| 5/16 | 84 | 888/892 ← Record high! |
| 5/17 | 83 | 766 @ 4:30PM |

Digital Catalyst
User-centric development for a digital workforce

FIG. 19

Sherlock

Up Next: Inspectors Forms, starting with Correctives

Problem: A word document is being used to document correctives.

- Human error (e.g. accidental deletion, incorrect entry)
- Multiple additional step in inspection process, including taking screenshots, copying into Paint, drawing red circles to mark issues, copying into word document
- Tedious, manual effort to collect images for model training Digital Catalyst
User-centric development for a digital workforce

FIG. 23

Digital Catalyst Vision

We make tools that put information at the fingertips of our employees to help them work better, Smarter, and more Safety. Our products are developed in collaboration with our user and in partnership with the business.

Today: Disparate solutions for specific situations, and lots of paper.

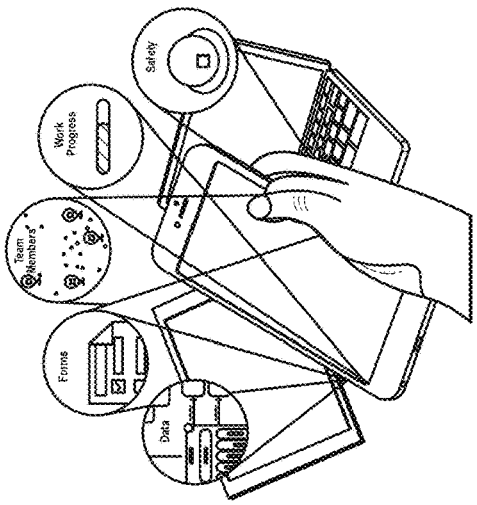

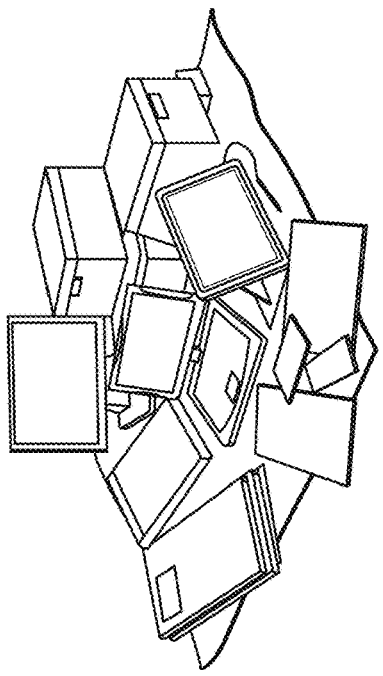

all the info needed in one place, and tools to get the job done.

FIG. 30

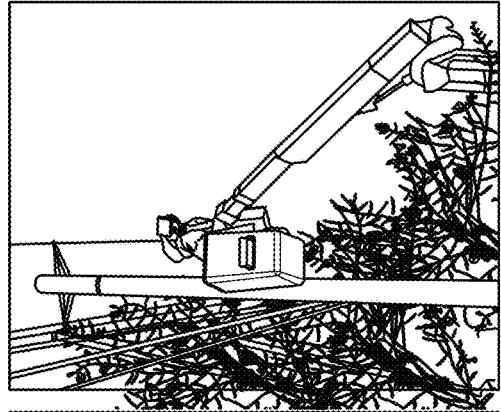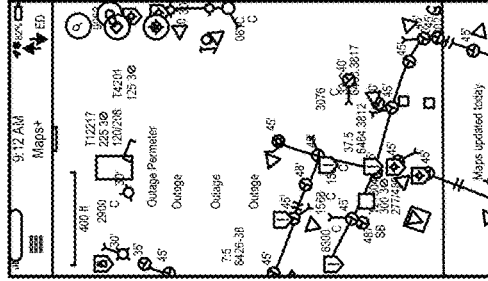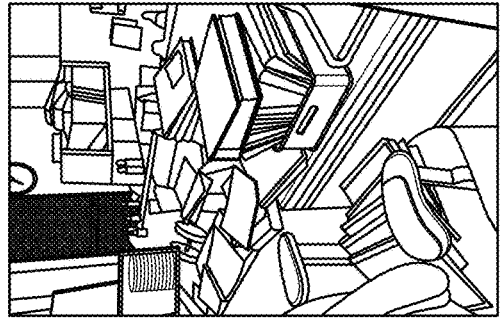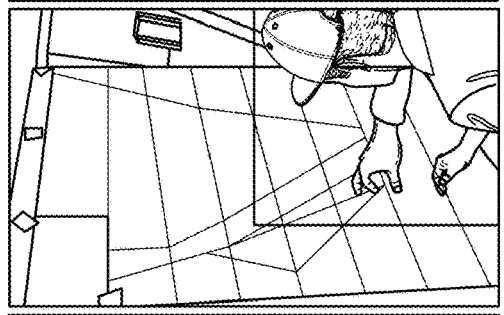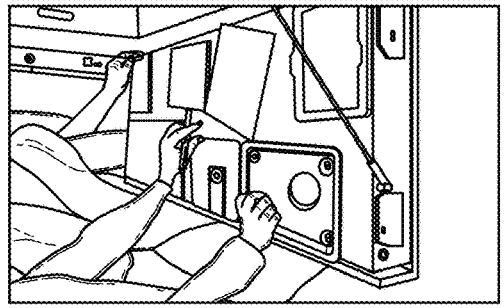
FIG. 31

FIG. 35

Meteorology, Climatology, & Fire Spread Modeling

- Weather and fuels inputs from 30-year high resolution weather and fuels model
- Monte Carlo fire simulations; probabilistic fire spread for emerging events
- Forecasted fire simulations triggered along all overhead lines every hour
- Identifies highest risk circuits/areas from a spread perspective
- Enables 'what if' and 'what could have been' analyses

ELECTRIC POWER GRID INSPECTION AND MANAGEMENT SYSTEM

CROSS-REFERENCE TO RELATED APPLICATIONS

This application claims the benefit of and priority to U.S. Provisional Application No. 62/880,043, filed Jul. 29, 2019, entitled "Electric Power Grid Inspection and Management System", the entire contents of which are incorporated herein by reference.

BACKGROUND

The world relies on electrical power to run everything from factory control systems to basic household appliances. Part of insuring a reliable source of power is continuing inspection of the infrastructure that delivers the electricity. Current methods of high voltage power lines involve humans performing difficult and time-consuming acts such as climbing power line poles and using helicopters with line testing. In addition to the difficulties faced by utility personnel, the cost associated with humans operating aerial and ground vehicles, as well as performing the analytics on the data collected, is significant and results in higher prices for the consumer.

Another utility inspection problem is the time it takes for a human to physically review the inspection material. Those qualified to review the inspection are often not the ones who gather the pictures and written descriptions of the questionable components. As a result, the actual evaluation of suspect equipment may not take place within the same week, much less the same day. If an image is taken the wrong way, or documentation missing, or more is information needed, then the inspection evaluation process can further be delayed.

In some states, utility companies are held liable for damage that their equipment causes, whether the companies acted negligently or not. One example may be a wildfire caused by a spark from a frayed wire, even if the wire was damaged by an animal.

Another problem faced by current inspection methods is that they are not optimized to determine wear over time. Often, it is a different person doing the inspection and/or image capturing of a piece of equipment. That person does not have a frame of reference for how the component has changed over time and therefore cannot predict future failures.

Therefore, there is a need for a better way to inspect electrical power infrastructure.

DESCRIPTION OF THE DRAWINGS

FIG. 1 illustrate the components of the system according to some embodiments.

FIG. 19 illustrates the efficiency improvement the system provides in some embodiments.

FIG. 23 shows an inspection model according to the prior art.

FIG. 30 illustrates how the system can combine multiple data sources into one centralized system.

FIG. 31 is an overview of the benefits the system provides as pertains to paper in some embodiments.

FIG. 35 is an overview of the capability of the system as pertains to meteorology, climatology, and fire spread modeling according to some embodiments.

DETAILED DESCRIPTION

FIG. 1 illustrate the components of the system according to some embodiments. According to some embodiment the system comprises one or more unmanned, programmable drones. In some embodiments, the autonomous drones are vehicles. In some embodiments, the drones are controlled by remote operators. In some embodiments, the drones are autonomous drones that do not need operator direction. In some embodiments, the drones are controlled and/or programmed by artificial intelligence (AI).

Figure 2:
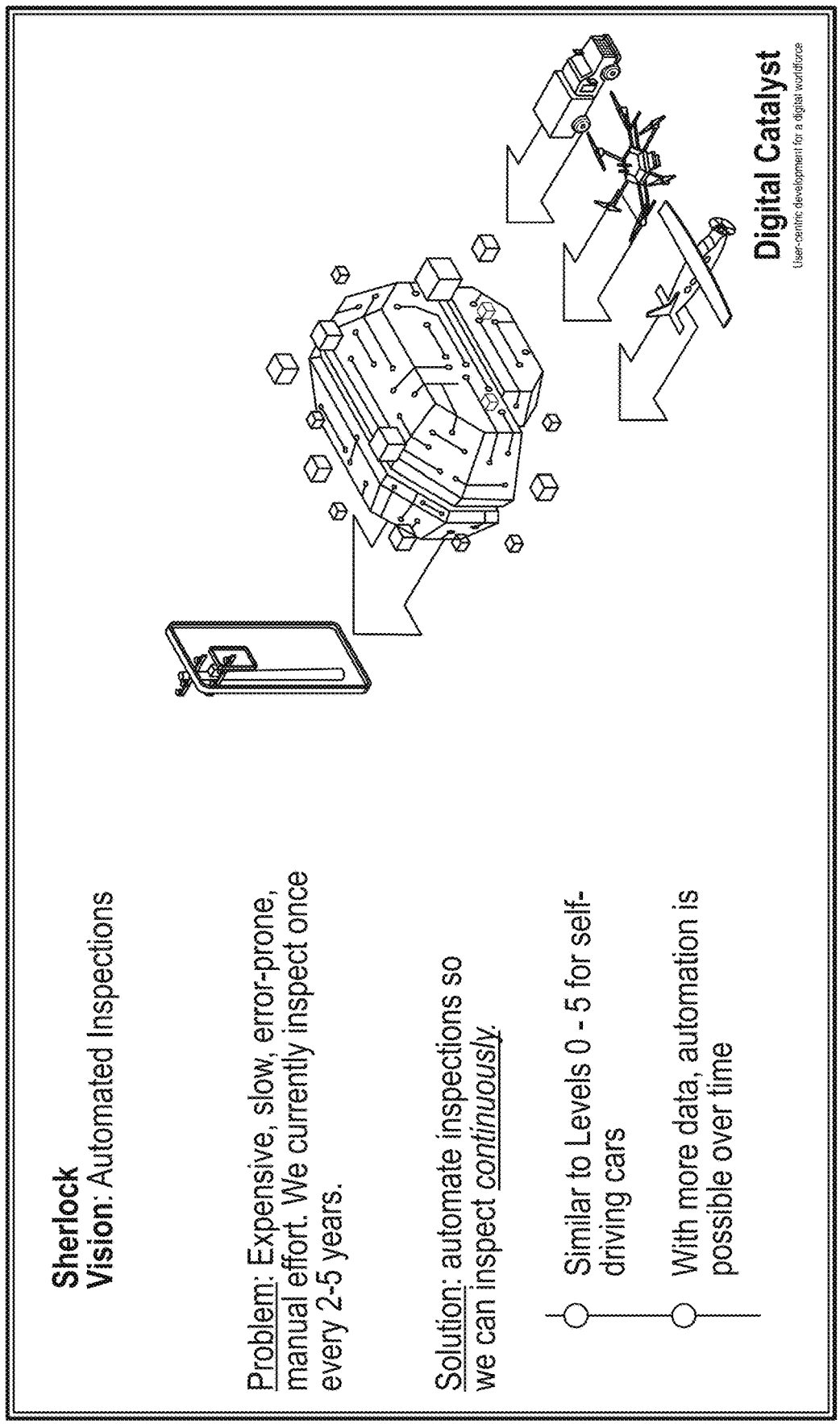
FIG. 2 shows an automated inspection model according to some embodiments.

FIG. 2 shows an automated inspection model according to some embodiments. According to some embodiments automated inspection is performed less than once every 5 years. In some embodiments, inspection is performed less than once every 2 years. In some embodiments, inspection is performed continuously. In some embodiments, inspection automation is graded by levels. In some embodiments, the automation grade is similar to what is used to describe automation in self-driving cars. In some embodiments, the levels are 0-5. In some embodiments, the levels are defined as follows: Level 0_No Automation; Level 1_Driver Assistance; Level 2_Partial Automation; Level 3_Conditional Automation; Level 4_High Automation; Level 5_Full Automation. In some embodiments, the data collected during inspection is used to improve the inspection process. In some embodiments, AI uses historical inspection data to improve recognition and/or prediction of infrastructure failure. For example, if images of human identified defects are made available to the AI, the AI in turn uses the images when evaluating similar equipment for defects according to some embodiments. In some embodiments, the inspection is performed using drones. In some embodiments, the drone is a land vehicle. In some embodiments, the drone is an unmanned aerial vehicle (UAV). In some embodiments, the drone is one or more of a car, boat, airplane, helicopter, satellite, rocket, or the like. In some embodiments, the UAVs comprise one or more rotors and/or propellers and/or engines.

Figure 3:
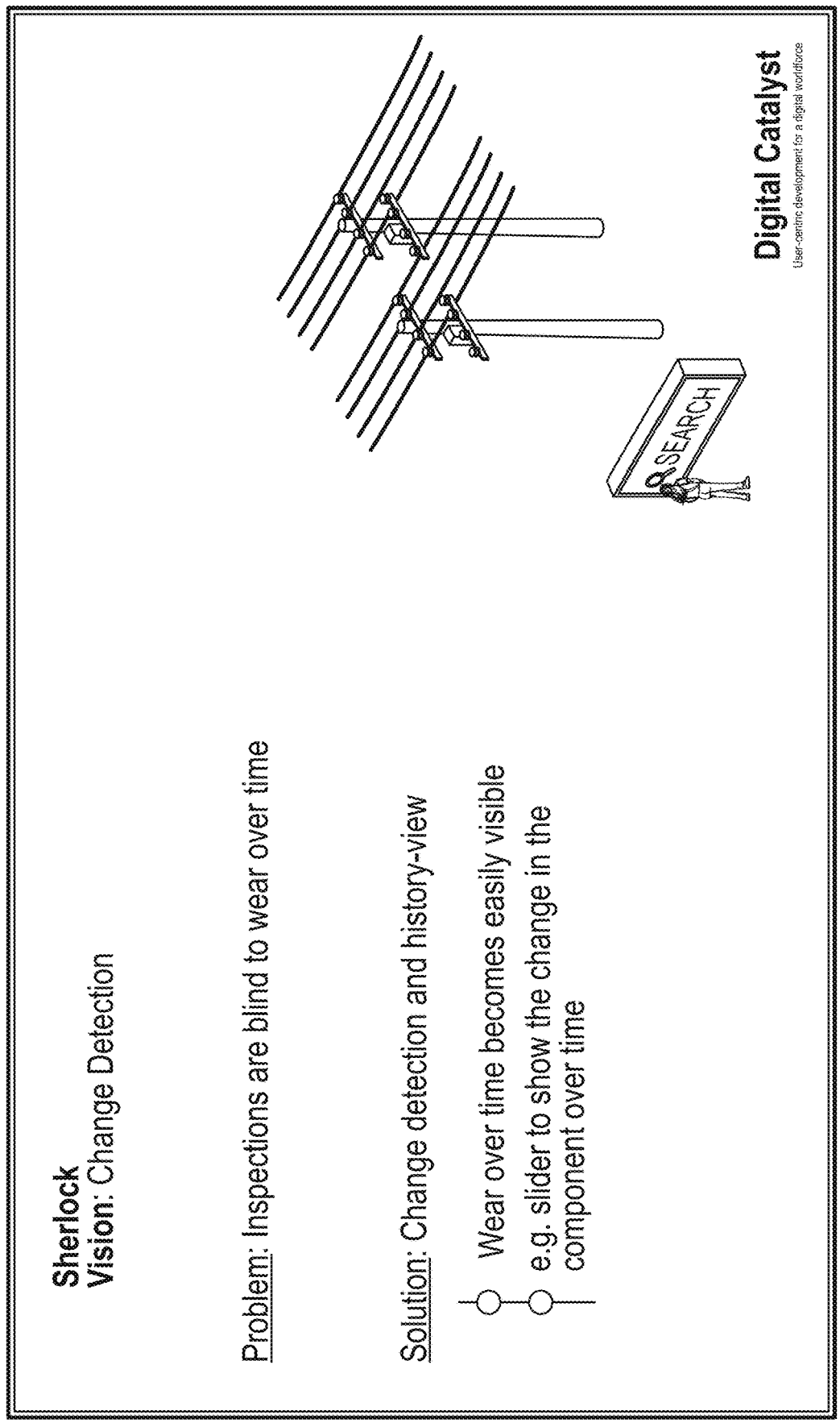
FIG. 3 illustrates a change detection system according to some embodiments.

FIG. 3 illustrates a change detection system according to some embodiments. In some embodiments, the change detection system shows structural wear over time. In some embodiments, the change detection system uses data to record changes in equipment. In some embodiments, the data is one or more of sensors, written notes, written forms, and/or reports. In some embodiments, the change detection system uses images to record changes over time. In some embodiments, the images are displayed in sequence so that changes are presented in a time lapsed form. In some embodiments, the sequence of images is displayed automatically, similar to a video. In some embodiments, the images can be scrolled through. In some embodiments, a slider is used for scrolling. In some embodiments, the images are time stamped. In some embodiments, AI uses the time stamps to form the sequence of images and/or data. In some embodiments, AI uses the sequence of images and/or data to improve equipment inspection evaluation.

Figure 4:
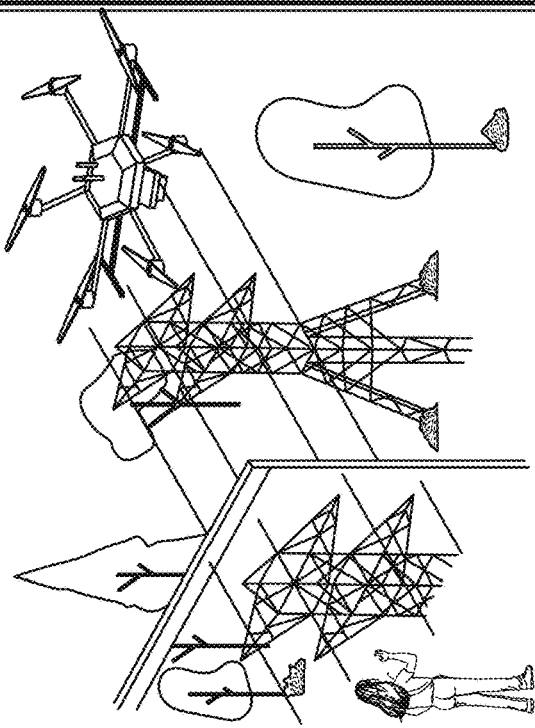
FIG. 4 shows an auto-label and search component of the system according to some embodiments.
Figure 5:
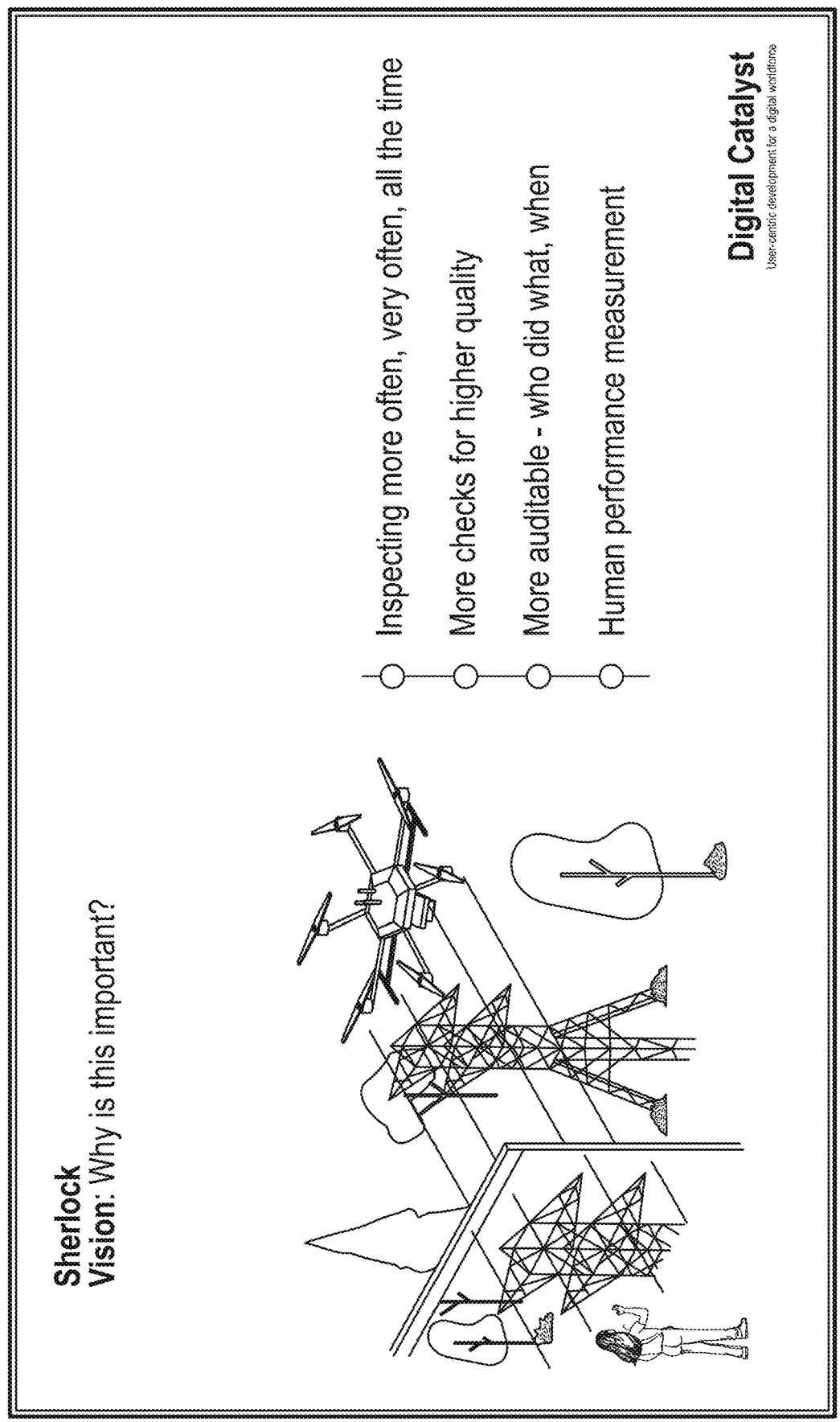
FIG. 5 highlights some features that comprise some embodiments of the system.

FIG. 4 shows an auto-label and search component of the system according to some embodiments. In some embodiments, one or more written descriptions associated with the search are used to pull relevant information. In some embodiments, AI compares images in a database to pull relevant information. In some embodiments, AI is configured to provide a description of one or more images processed without human assistance. In some embodiments, AI s configured to provide identification of one or more defects associated with one or more images and stores each image and associated component description in defect description in a label database. In some embodiments, the label database can be searched using one or more of a voice command search and/or a written quarry search. In some embodiments, AI can be used to pull the relevant information for a label database search request. In some embodiments, a search such as "show me all the cracked insulators" will return images and reports of all cracked insulators in the database. In some embodiments, "find all worn C-hooks in Tiers 2 and 3" will return images and reports of worn C-hooks in those areas. Such commands are meant to be non-limiting examples, and those of ordinary skill would realize that there are various search commands that can be executed by the system.

Figure 6:
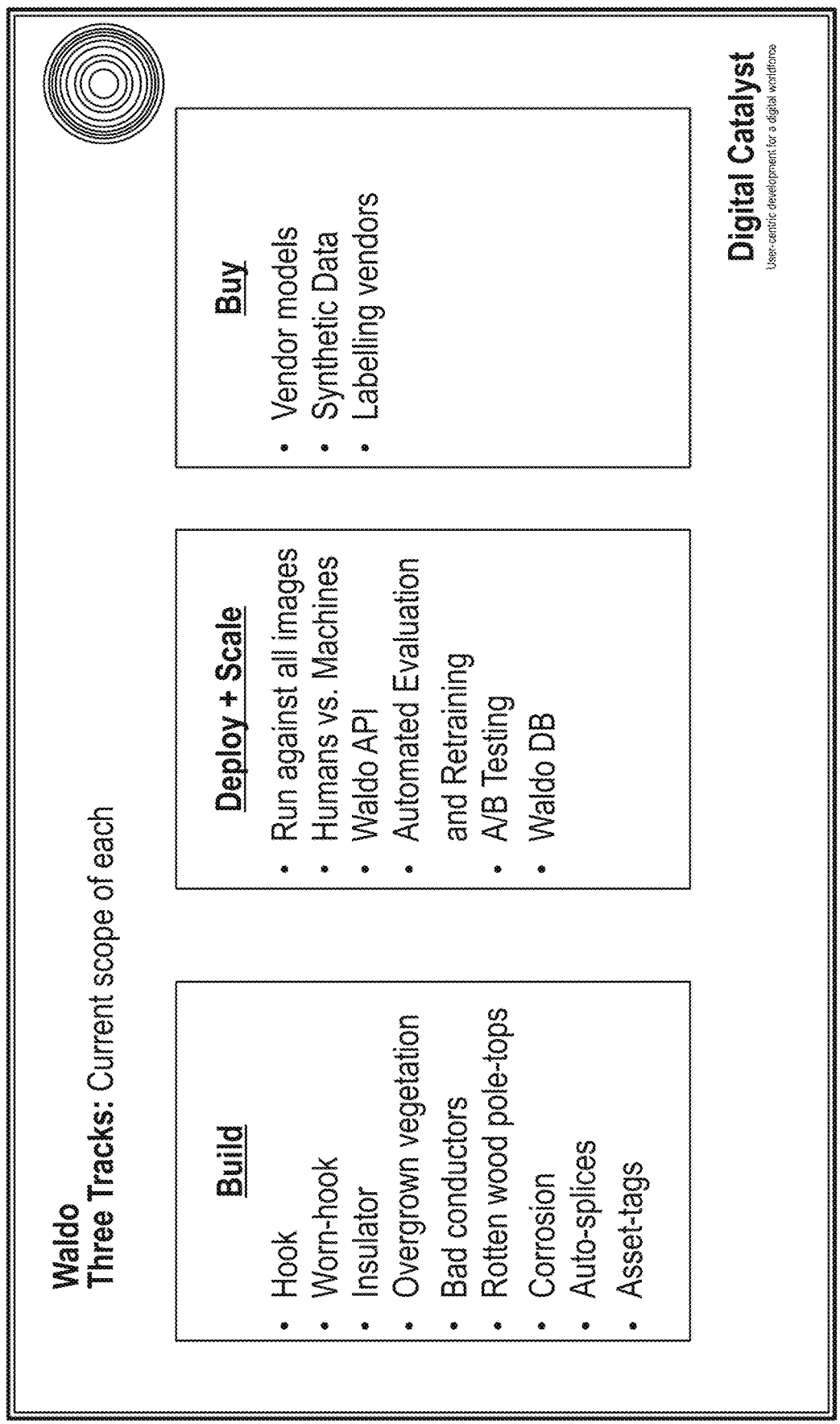
FIG. 6 illustrates an Application Programming Interface (API) according to some aspects of the inventions.

FIG. 6 illustrates an Application Programming Interface (API) according to some aspects of the inventions. In some embodiments, the API allows one or more computer applications to communicate with each other. In some embodiments, the API requests and receives data from one or more databases. In some embodiments, the API can request data associated with one or more inspected structural components. In some embodiments, structural components can include one or more of a hook, worn-hook, insulator, overgrown vegetation, bad conductors, rotten wood pole-tops, corrosion, auto-splices, and/or asset tags. In some embodiments, the system comprises one or more steps associated with structural component evaluation including, but not limited to: image comparison, human vs. machine comparison, APIs setup, automated evaluation and retraining, AB testing, and/or database population. In some embodiments, vendor models are used for data evaluation. In some embodiments, database population comprises using synthetic data. In some embodiments, third party vendors provide the software or hardware for labeling collected data, such as images, for example.

Figure 7:
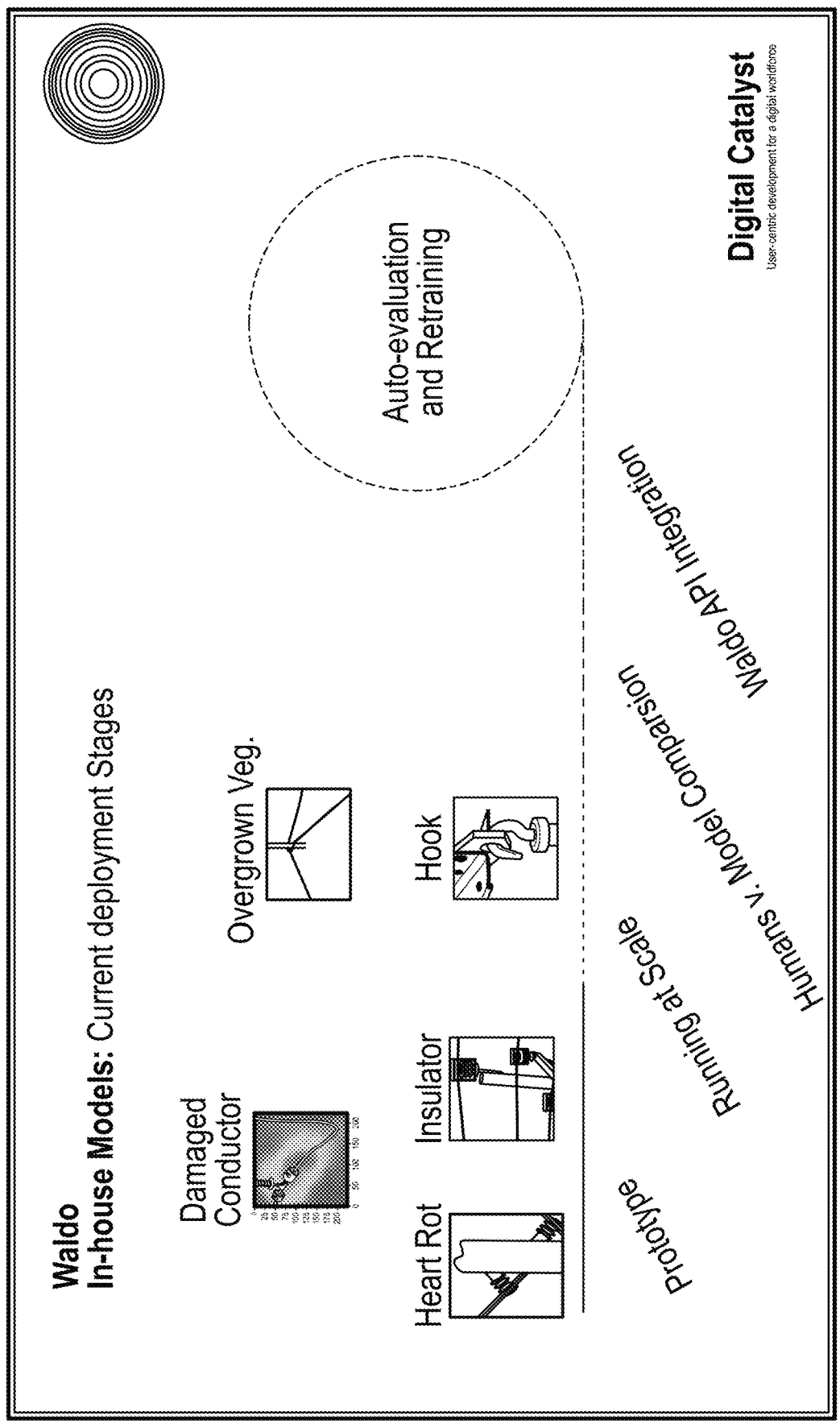
FIG. 7 shows the models of the system according to some embodiments. In some embodiments, the models are used by one or more of human, computers, vendors, or AI to evaluate structures.

FIG. 7 shows system models according to some embodiments. In some embodiments, the models are used by one or more of humans, computers, vendors, or AI to evaluate structures and/or to train AI. In some embodiments, the model comprises one or more of heart rot, damaged conductors, insulators, overgrown vegetation, and/or hooks. In some embodiments, system deployment comprises one or more of prototyping the system, running the system, scaling the system, comparing the system's use of models for data evaluation vs. using humans for evaluation, integrating APIs to communicate with other systems and/or databases, auto-evaluating system performance, retraining the system based on feedback. In some embodiments, feedback can come from one or more of human feedback, feedback from other systems, or AI feedback.

Figure 8:
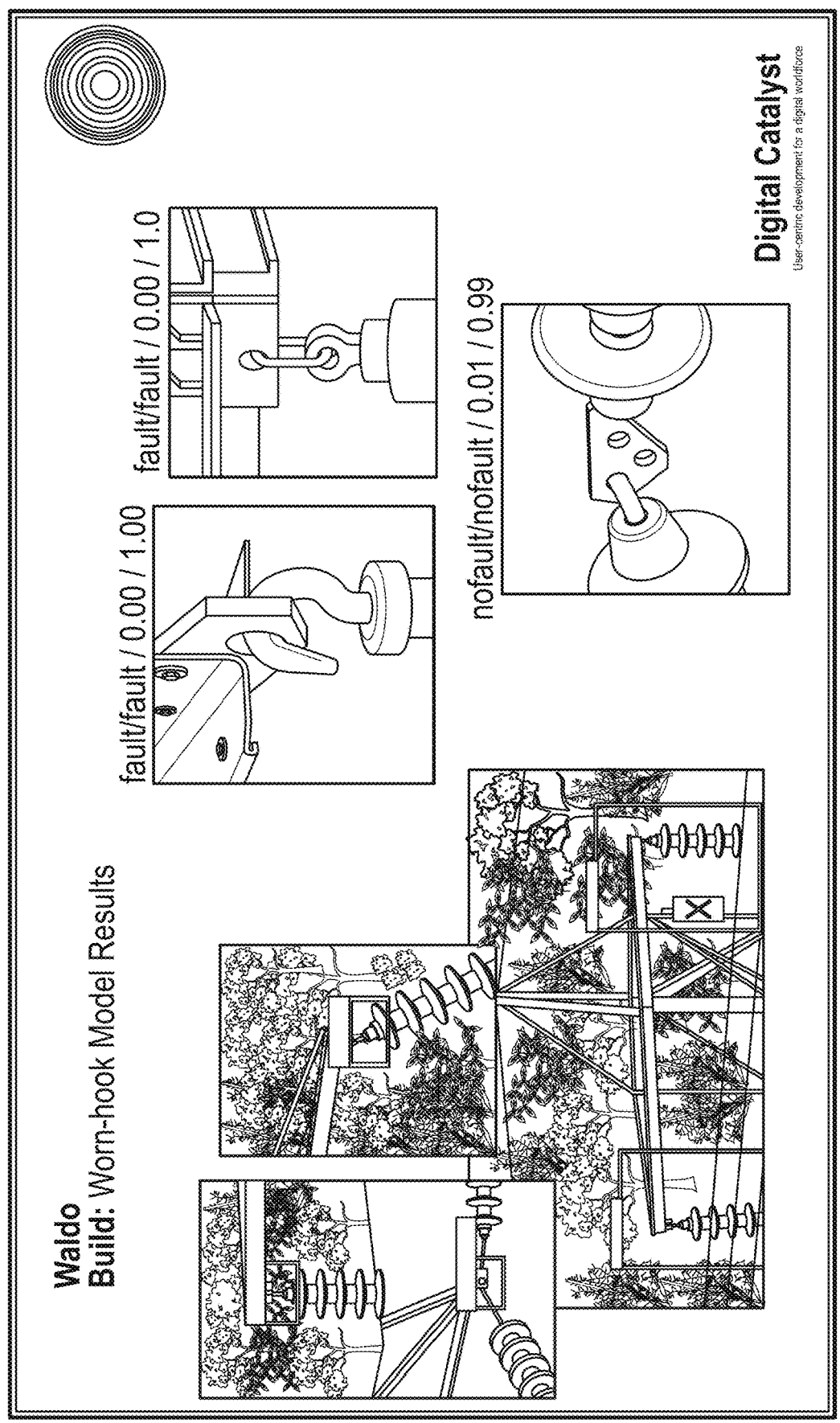
FIG. 8 shows example worn-hook model images that are obtained using some embodiments of the present system.

FIG. 8 shows example worn-hook model images that are obtained using some embodiments of the present system. In some embodiments, the worn-hook model images can include part identification using highlighting and/or surrounding in the image. In some embodiments, the worn-hook model images can include one or more of name, location, and/or orientation tags. In some embodiments, a Global Positioning System (GPS) is used to determine location of the worn hook. In some embodiments, the worn-hook model images can include a fault or no fault description. In some embodiments, the worn-hook model images comprise defect identification.

Figure 9:
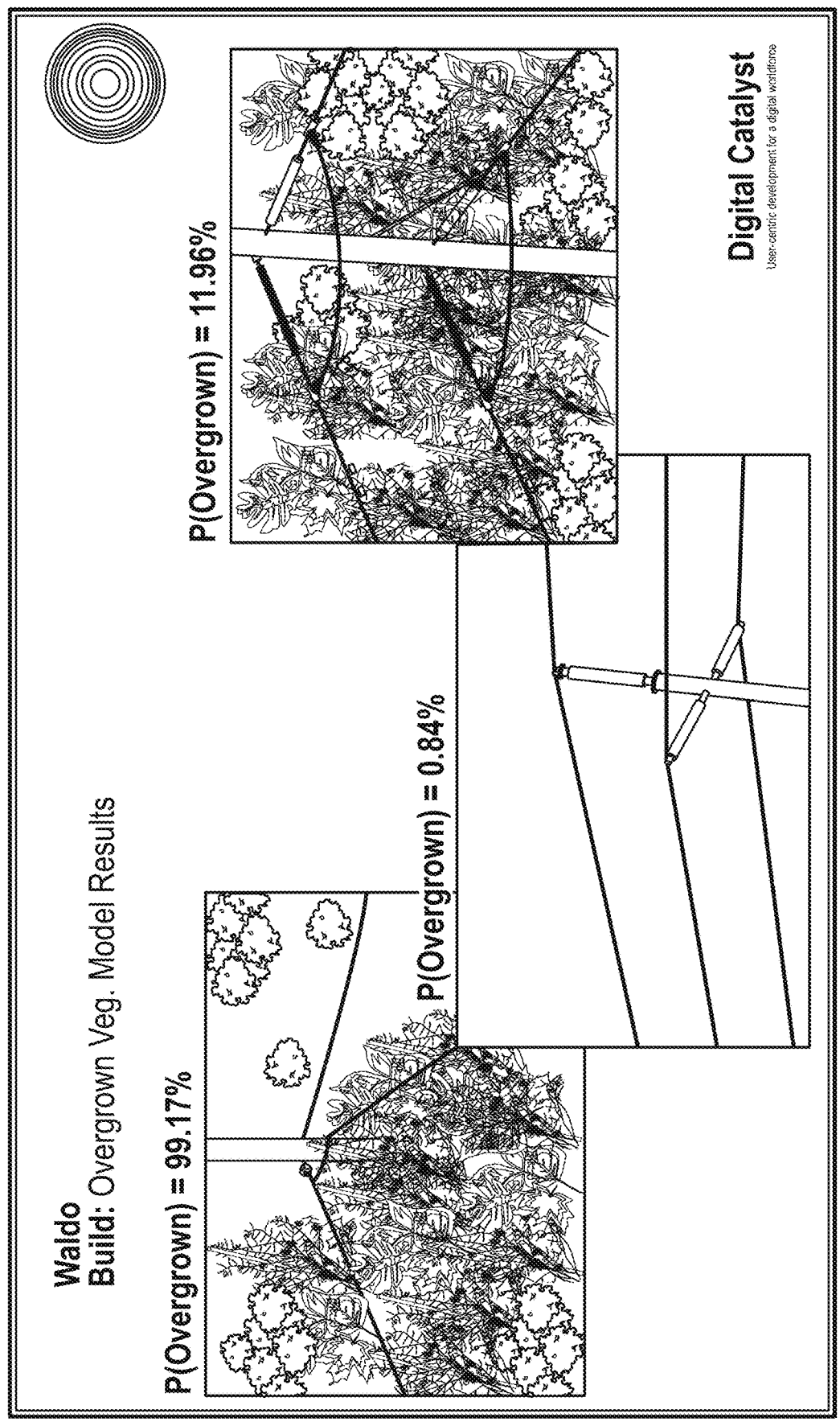
FIG. 9 shows vegetation overgrowth models according to some embodiments of the system.

FIG. 9 shows vegetation overgrowth models according to some embodiments of the system. In some embodiments, the overgrowth models can comprise an image of the inspection area. In some embodiments, the system provides an overgrown percentage associated with the inspection area. In some embodiments, the overgrown percentage data evaluation is provided by one or more of a human, a computer program, and/or AI.

Figure 10:
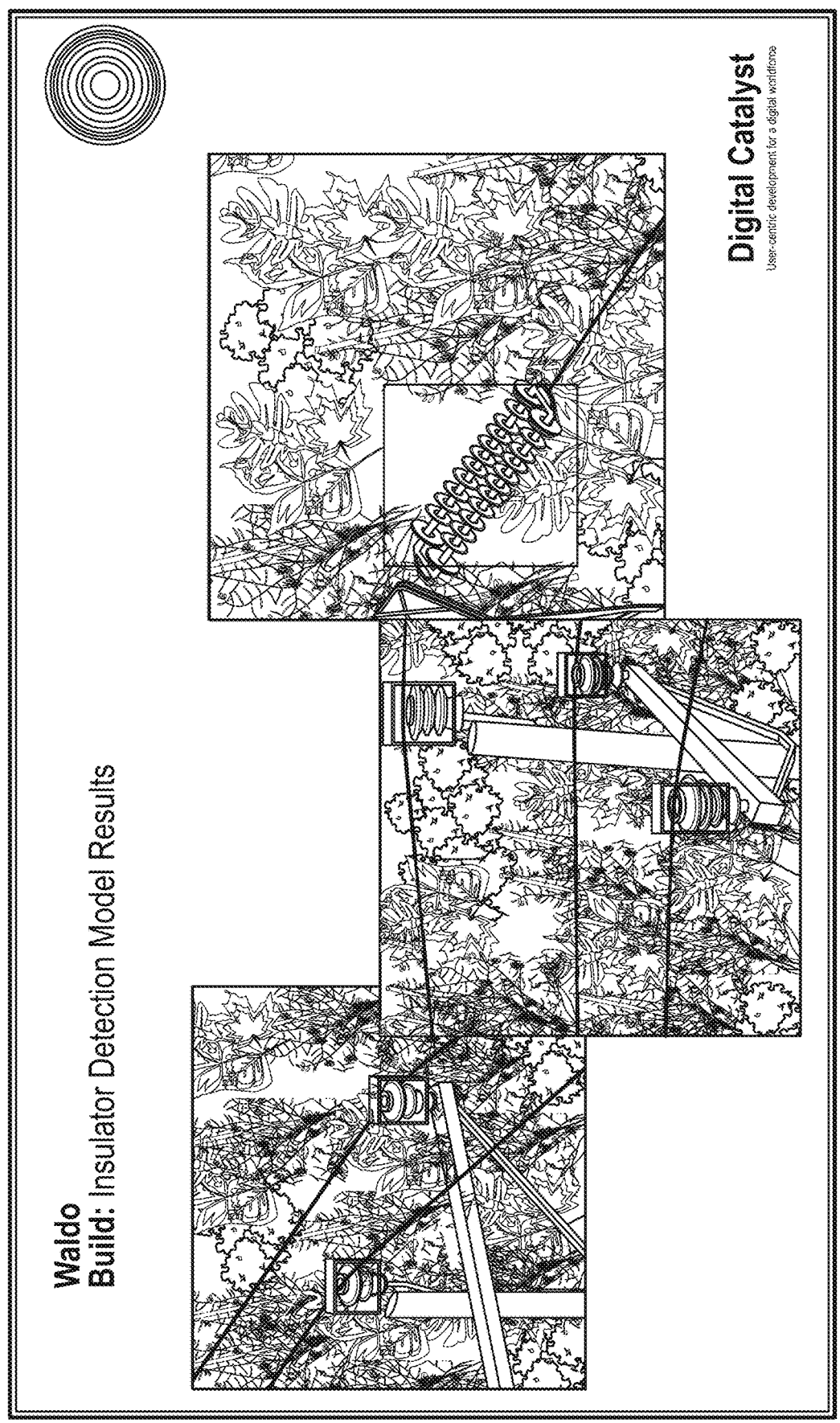
FIG. 10 shows insulator detection models according to some embodiments of the system.

FIG. 10 shows insulator detection models according to some embodiments of the system. In some embodiments, the insulator detection models can comprise one or more of name, location, and/or orientation tags. In some embodiments, the insulation detection models comprise identification of defects. In some embodiments, insulator detection data evaluation is provided by one or more of a human, a computer program, and/or AI.

Figure 11:
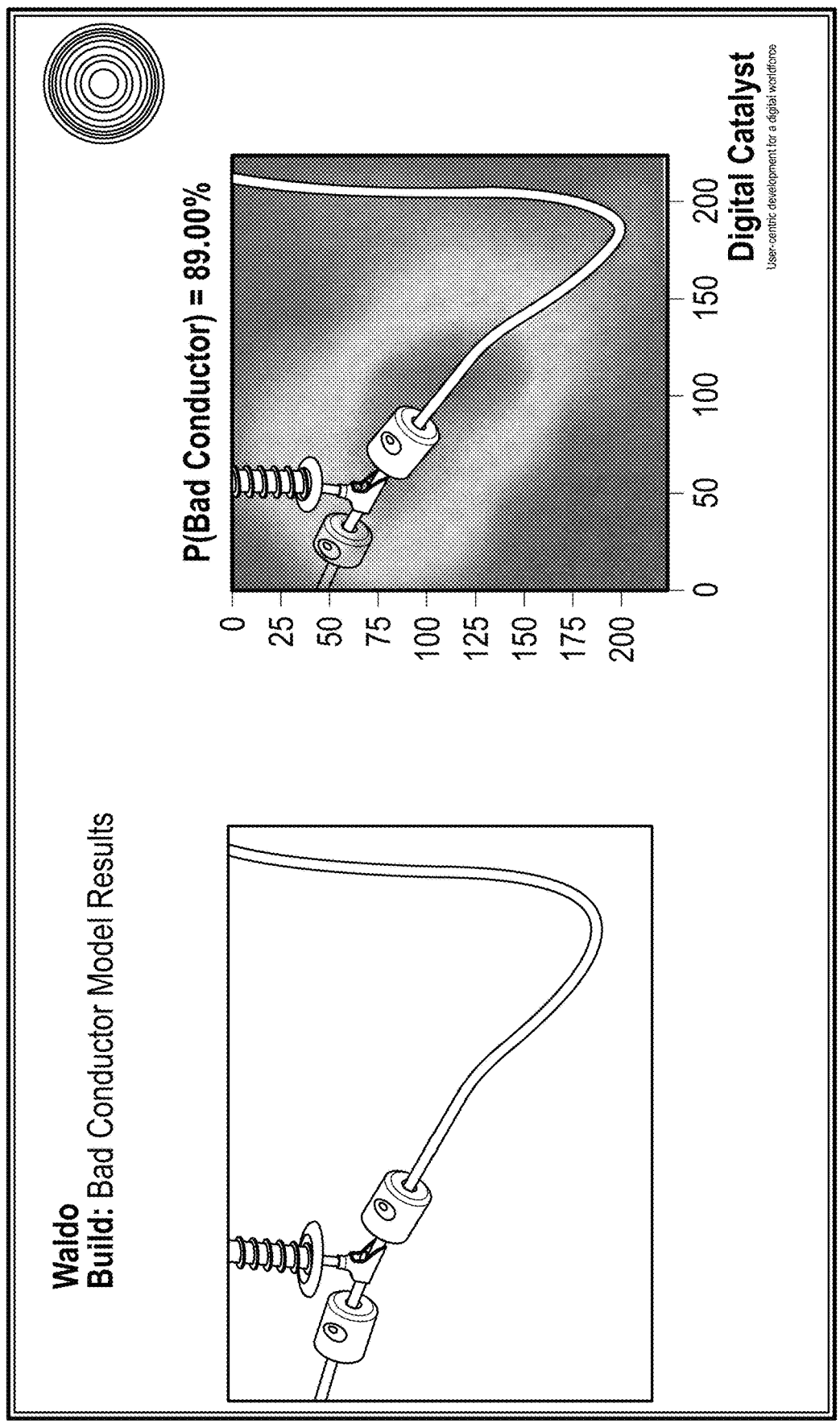
FIG. 11 shows bad conductor models according to some embodiments of the system.

FIG. 11 shows bad conductor models according to some embodiments of the system. In some embodiment the image taken at the inspection site is evaluated using one or more of a human, a computer program, and/or AI. In some embodiments, the system provides an evaluation image identifying the defect. In some embodiments, the evaluation image comprise a percentage of the structure that is defective.

Figure 12:
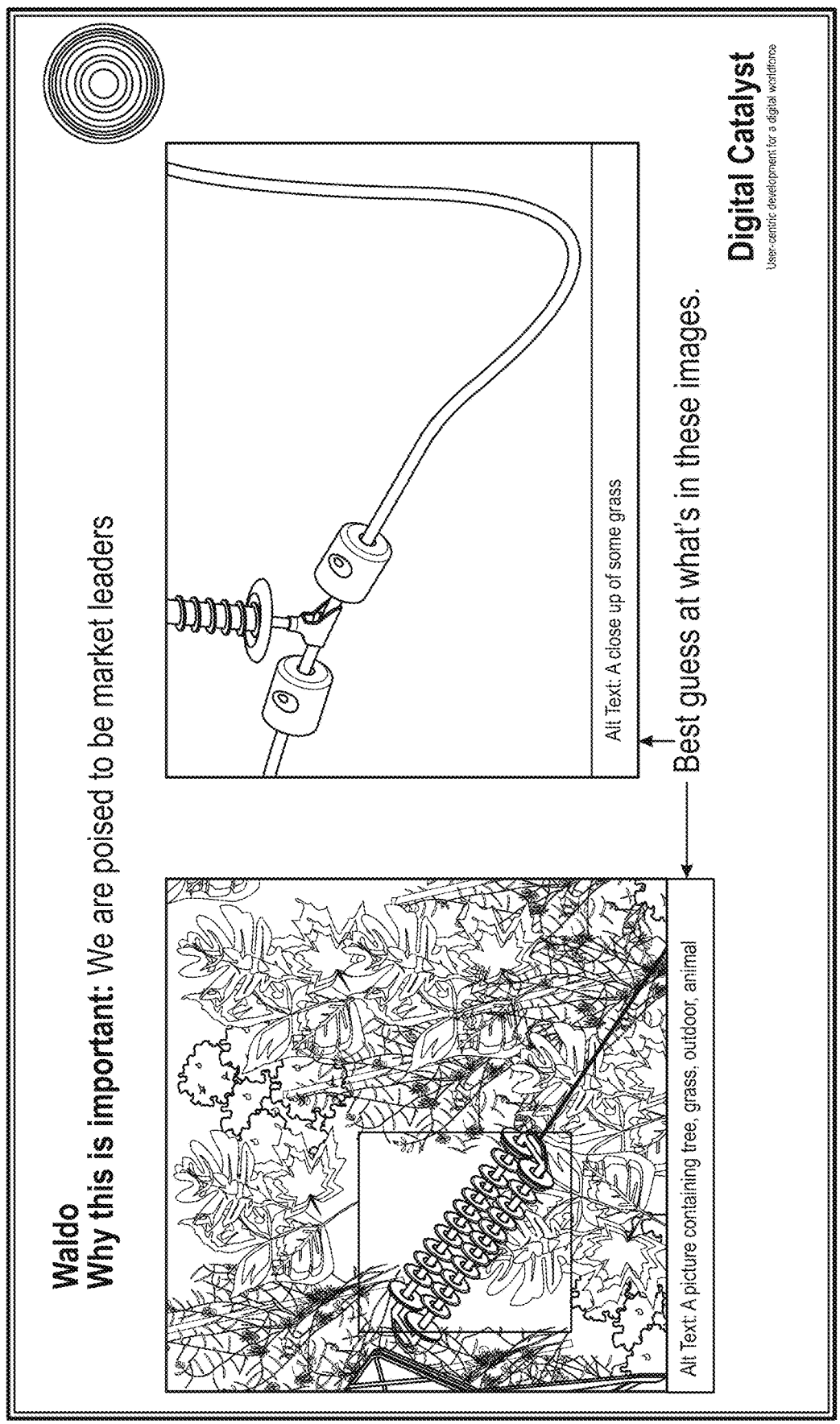
FIG. 12 shows the current state of the art for evaluation of electrical structures using computer executable instructions.

FIG. 12 shows the current state of the art for evaluation of electrical structures using computer executable instructions. The prior art is not able to isolate the structures from their surrounds, and as a consequence cannot identify the structures, much less their associated defects.

Figure 13:
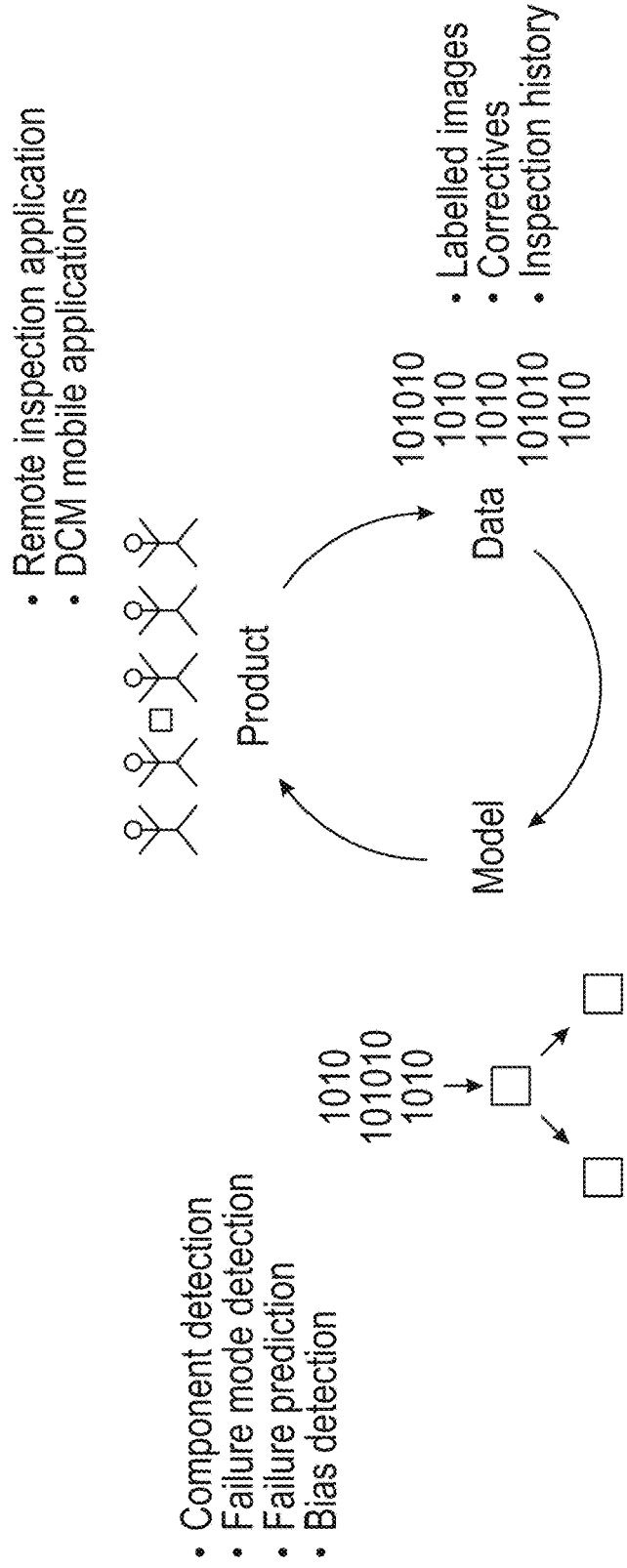
FIG. 13 is an illustration the virtuous cycle of data according to some embodiments of the system.

FIG. 13 is an illustration the virtuous cycle of data according to some embodiments of the system. In some embodiments, the data cycle comprises a constant feedback loop with one or more of a product, data, and a model. In some embodiments, a product comprises remote inspection application and/or Data Collection and Monitoring (DCM). In some embodiments, data comprises labelled images, correctives, and/or inspection history. In some embodiments, a model comprises component detection, failure mode detection, failure prediction, and/or bias detection.

Figure 14:
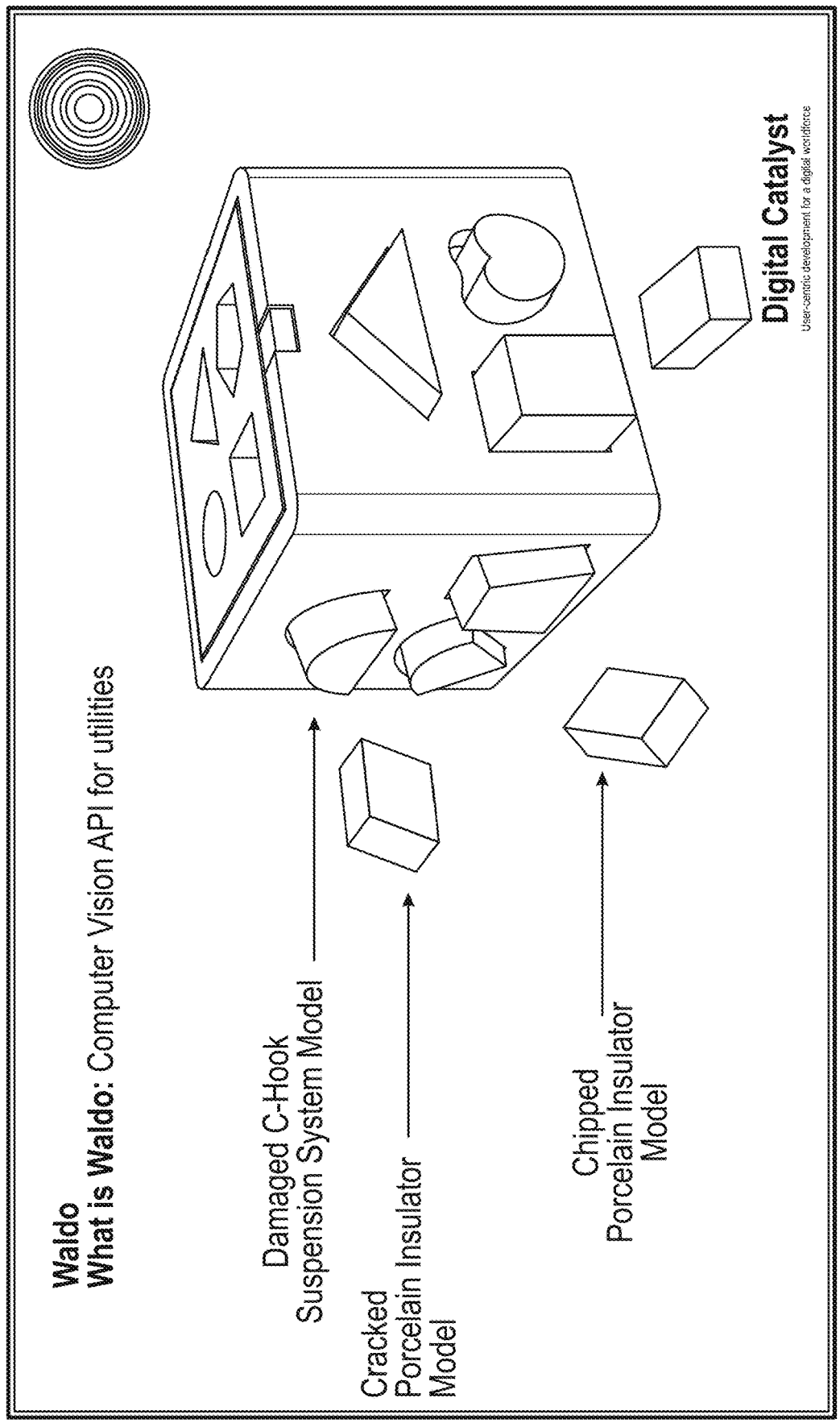
FIG. 14 is an example API according to some embodiments of the system.

FIG. 14 is an example abstract API model according to some embodiments of the system. In some embodiments, the API enables communication among multiple evaluation models. In some embodiments, multiple evaluation models can comprise one or more of damaged C-hook suspension system models, cracked porcelain insulator models, chipped porcelain insulator models, or any other model associated with a structural defect.

Figure 15:
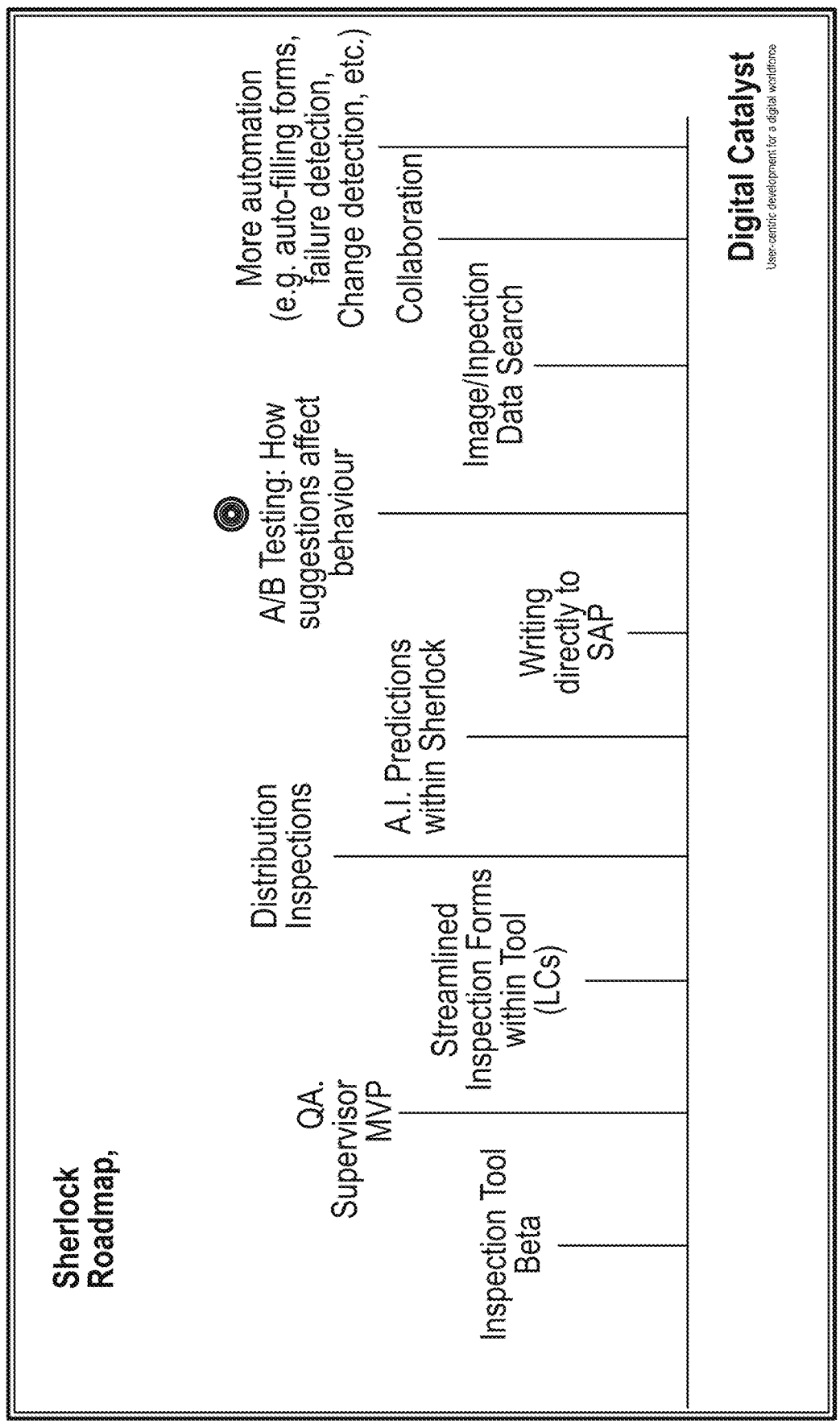
FIG. 15 illustrates steps for implementing the system according to some embodiments.

FIG. 15 illustrates steps for implementing the system according to some embodiments. In some embodiments, steps comprise one or more of creating a testing beta version; beta evaluation by quality, supervisor, or specialist personnel; performing distribution inspections; using AI to identify current defects; using AI to identify future defects and/or equipment degradation; evaluation of data using analytics software; adding suggestions to the evaluation model to improve results; creating an image inspections database using one or more of humans, other databases, or drones; searching the image inspection database; collaboration on system improvements; automating one or more of auto-filling forms, failure detection, change detection, or any other process previously performed by a human in the prior art.

Figure 16:
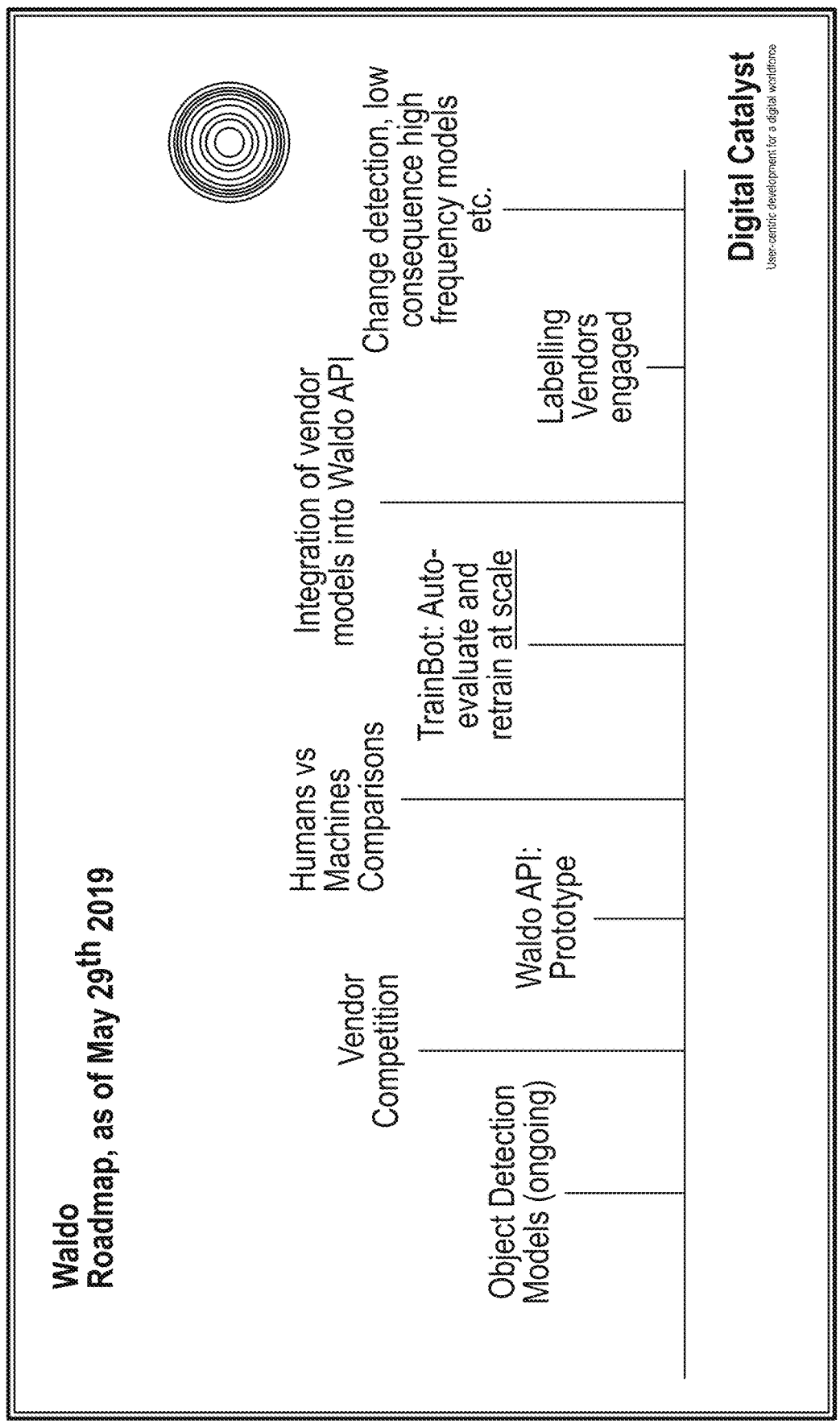
FIG. 16 illustrates steps for implementing the system according to some embodiments.

FIG. 16 illustrates steps for implementing the system according to some embodiments. In some embodiments, steps comprise one or more of creating object detection models, determining vendor system compatibility/capability; implementing API; comparing the system models and identification tools against human capabilities; training and retraining personnel; integrating compatible vendor models into the system; connecting the compatible models using API; integrating labeling models into the system; integrating change detection models into the system.

Figure 17:
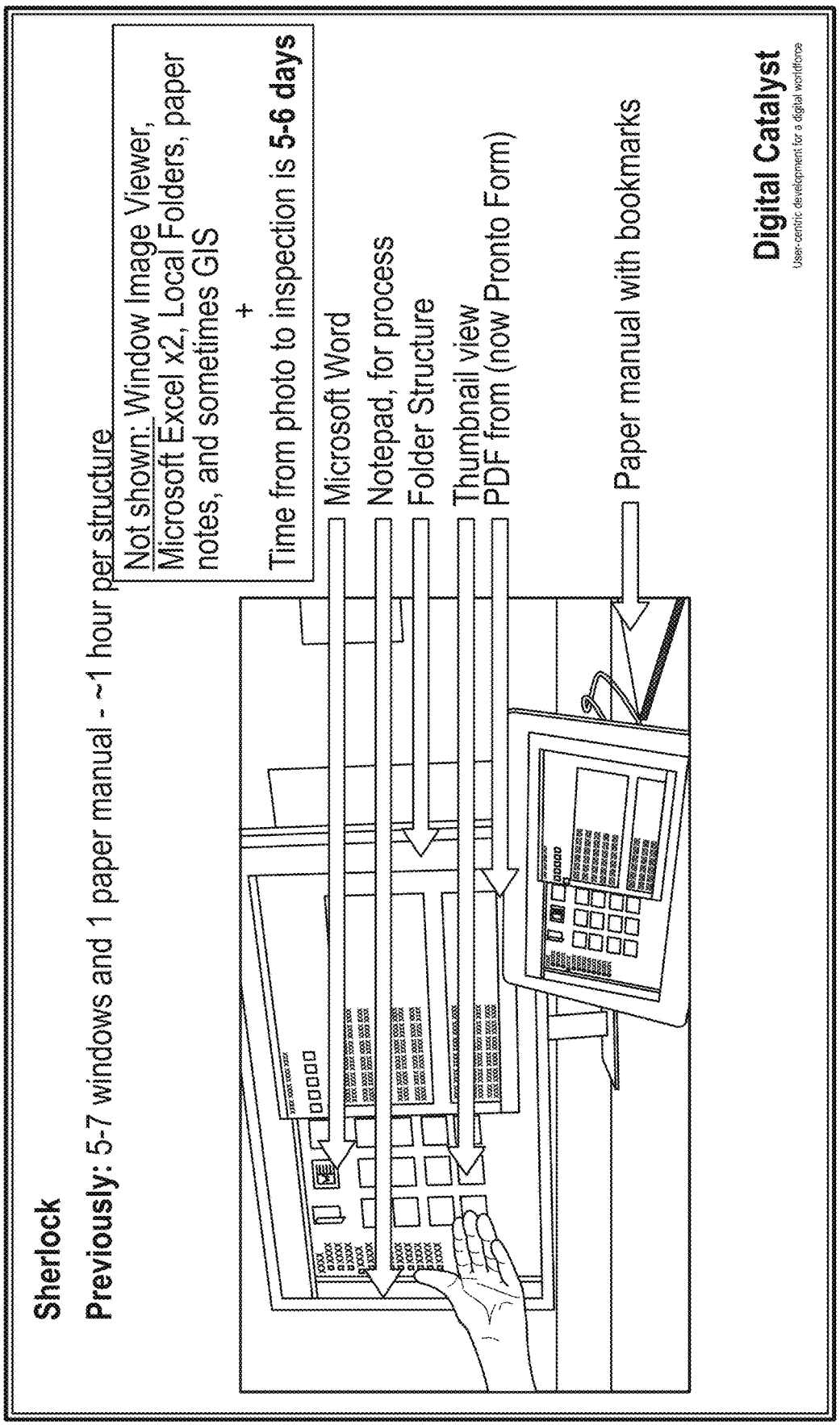
FIG. 17 shows an electrical structural evaluation system of the prior art.

FIG. 17 shows an electrical structural evaluation system of the prior art. Previous art used various non-linked data collection methods that were not capable of communicating with each other. For example, the prior art would use paper, Windows image viewer, Microsoft Excel, local folders, pdfs, thumbnail views, and the like. The information is not readily available and an inspection can take 5-6 days, for example. Some embodiments of the present system, by contrast, can collect and process data continuously and in real time, identifying problem structures before they become a liability.

Figure 18:
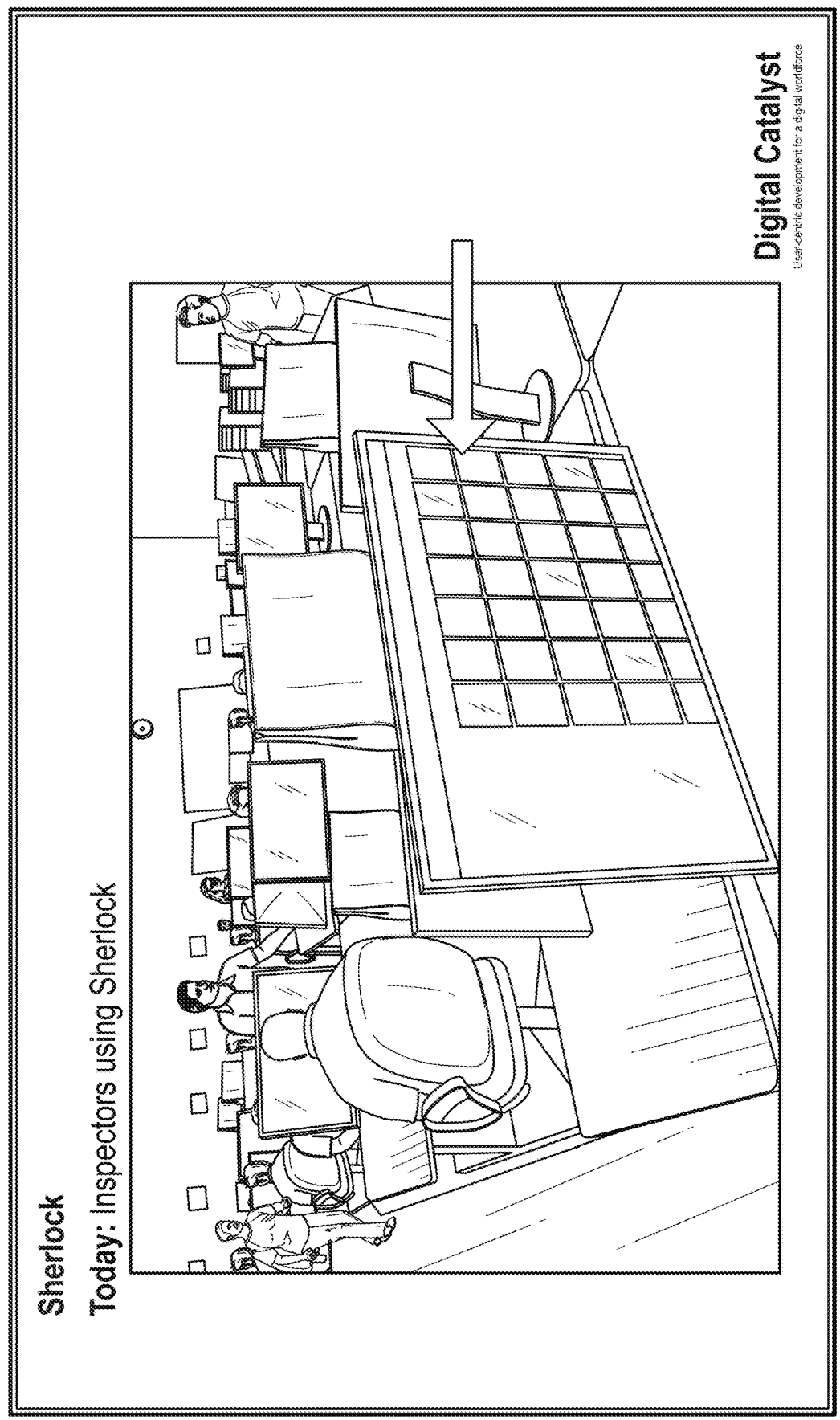
FIG. 18 shows inspectors using the present system according to some embodiments.

FIG. 18 shows inspectors using the present system according to some embodiments. In some embodiments, multiple inspection structures and locations are displayed. In some embodiments, past and present structural images are displayed. In some embodiments, no images are displayed and structural information is displayed in written form.

FIG. 19 illustrates the efficiency improvement the system provides in some embodiments. In some embodiments, inspectors can set new records using some embodiments of the present system.

Figure 20:
FIG. 20 illustrates the value of auto-assignment in some embodiments.

FIG. 20 illustrates the flexibility of the system to run on multiple platforms. For example, if the AI portion of the system is unavailable, a collaborative system can be used for model evaluation.

Figure 21:
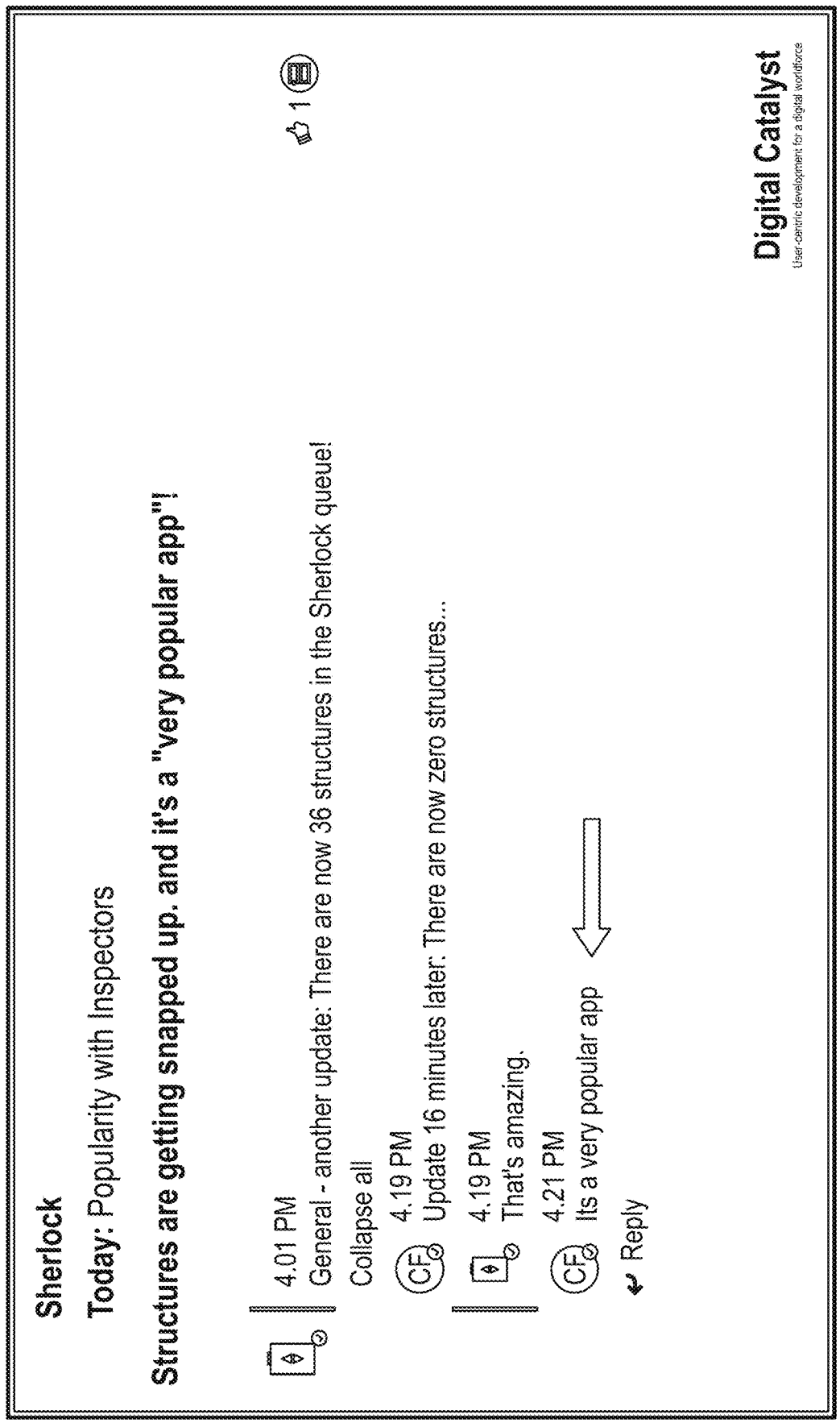
FIG. 21 is an example of the market demand for the improvements provided by the system in some embodiments.

FIG. 21 is an example of the market demand for the improvements provided by the system in some embodiments. FIG. 21 also exemplifies the improvements in evaluation time as recognized by those of ordinary skill.

Figure 22:
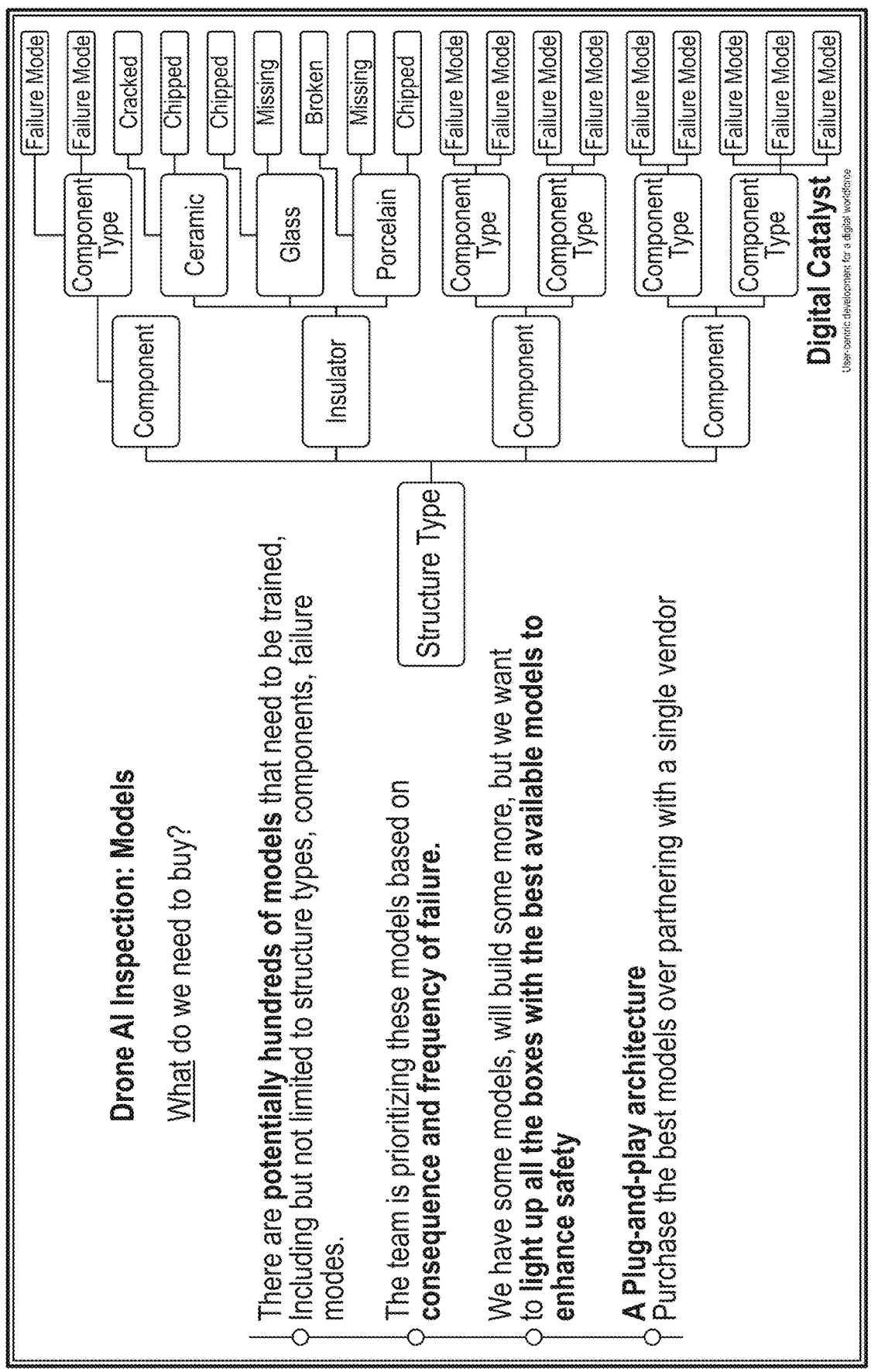
FIG. 22 shows drone AI inspection models according to some embodiments.

FIG. 22 shows drone AI inspection models according to some embodiments. According so to some embodiments AI inspection models need to be trained. In some embodiment model training comprises entering data related to structure types, components, and failure modes. In some embodiments, training is prioritized based on consequence of the failure and/or frequency of the failure. In some embodiments, model selection and/or training prioritization is determined by the model's contribution to the safety of the infrastructure. In some embodiments, the model software and hardware is provided by one or more of the infrastructure owning company; a single vendor; and/or multiple vendors. In some embodiments, multiple venders are chosen to obtain the best available models for a particular application.

FIG. 23 shows an inspection model according to the prior art. Previous inspection models consisted of Word documents for capturing information. Problems associated with the prior art include human error, accidental deletion, and incorrect entry. Inefficiencies in the prior art include multiple additional steps in the inspections process, the use of screenshots, copying into paint, drawing red circles, copying into a Word document, as well as other tedious manual efforts to collect images.

Figure 24:
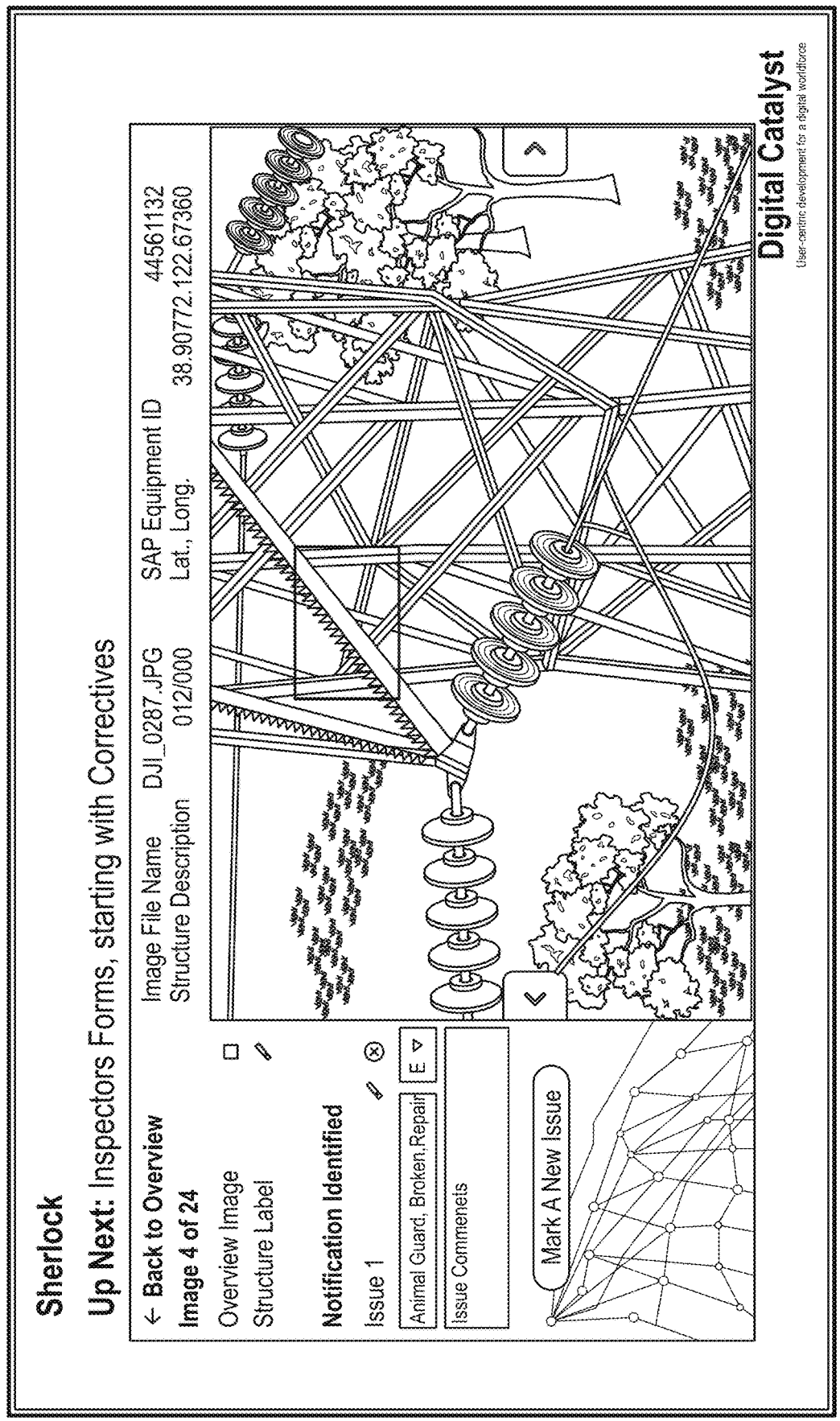
FIG. 24 shows a structural evaluation according to some embodiments of the invention.

FIG. 24 shows a structural evaluation according to some embodiments of the invention. In some embodiments, the system provides an overview of the structure. In some embodiments, the system provides a list of defect issues associated with a structure. In some embodiments, the system provides a notification of the number of defect issues. In some embodiments, the system provides a description of the defect issues. In some embodiments, the system allows a user to make comments. In some embodiments, the system allows users to mark a new defect issues. In some embodiments, the system comprises one or more of and image file name; a structure description; a structure label; an equipment identification (ID); and/or a position. In some embodiments, position is displayed as longitude and latitude. In some embodiments, the location is displayed on a map.

Figure 25:
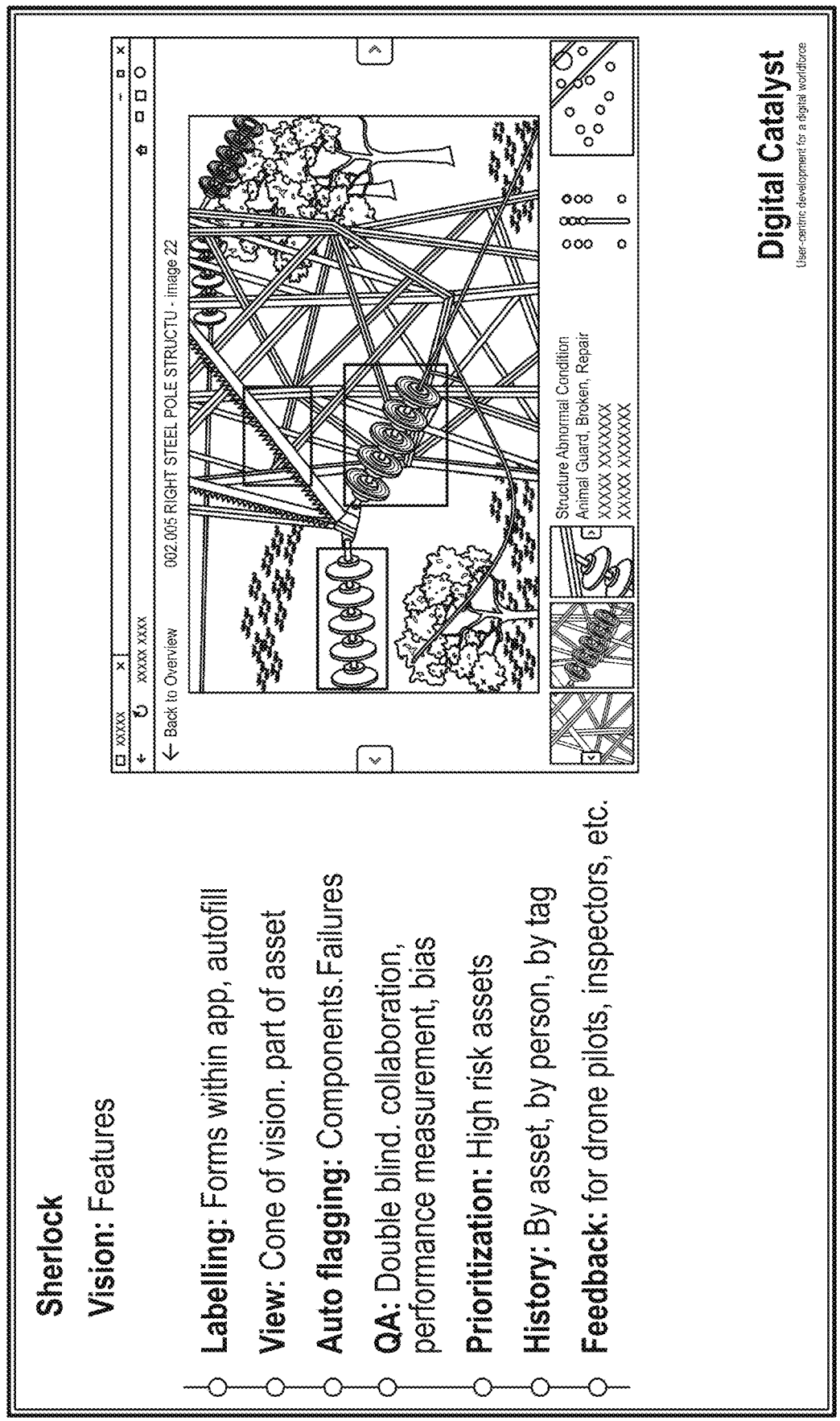
FIG. 25 also shows a structural evaluation according to some embodiments of the invention.

FIG. 25 shows a structural evaluation according to some embodiments of the invention. In some embodiments, the system automatically performs structural reporting. In some embodiments, structural reporting comprises defect evaluation, identifying defects within an image, and/or auto populating and formatting all required forms and documentation. In some embodiments, structural reporting comprises one or more of labelling, setting viewing area, auto flagging, quality assurance, prioritization, history, and feedback. In some embodiments, labeling comprises labeling forms and pictures automatically. In some embodiments, setting viewing area comprises setting cone of vision or a portion of the structural asset. In some embodiments, auto flagging comprises flagging components and component failures. In some embodiments, quality assurance comprises double blind, collaboration performance measurement, and/or bias. In some embodiments, prioritization comprises prioritizing high-risk assets. In some embodiments, history comprises inspection data including, but not limited to structure asset name, inspection person name, tag name, or any other information stored at the time of inspection. In some embodiments, feedback comprises supplying corrective information to drone pilots, inspectors, management, vendors, office and field employees, or any other associated personnel.

Figure 26:
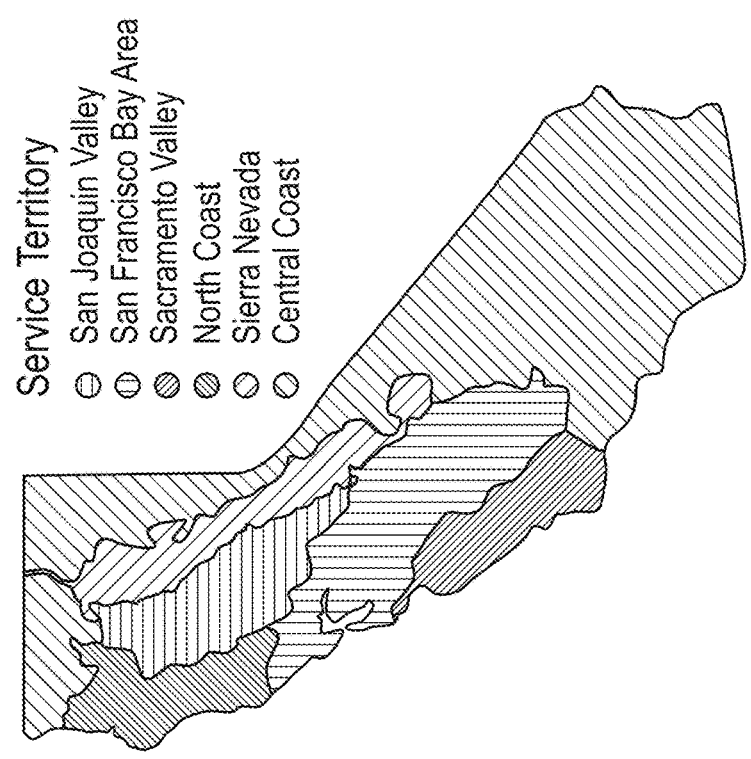
FIG. 26 shows part of the infrastructure required to facilitate the creation, transmission, and delivery of electrical power according to some embodiments of the invention.

FIG. 26 shows part of the infrastructure required to facilitate the creation, transmission, and delivery of electrical power according to some embodiments of the invention. In some embodiments, the infrastructure comprises 70,000 sq. mile service territory, serving approximately 16 million people. In some embodiments, the infrastructure comprises 5.4 million electric customer accounts; 4.3 million gas customer accounts. In some embodiments, the infrastructure comprises 23,000 employees. In some embodiments, the infrastructure comprises More than 125,000 circuit miles of electric distribution and transmission lines. In some embodiments, the infrastructure comprises more than 48,000 miles of gas pipeline. In some embodiments, the infrastructure comprises 39% of energy from renewables, targeting 50% by 2030; currently ~80% GHG-free. In some embodiments, the infrastructure comprises ~$16.8 billion in revenue (2018).

Figure 27:
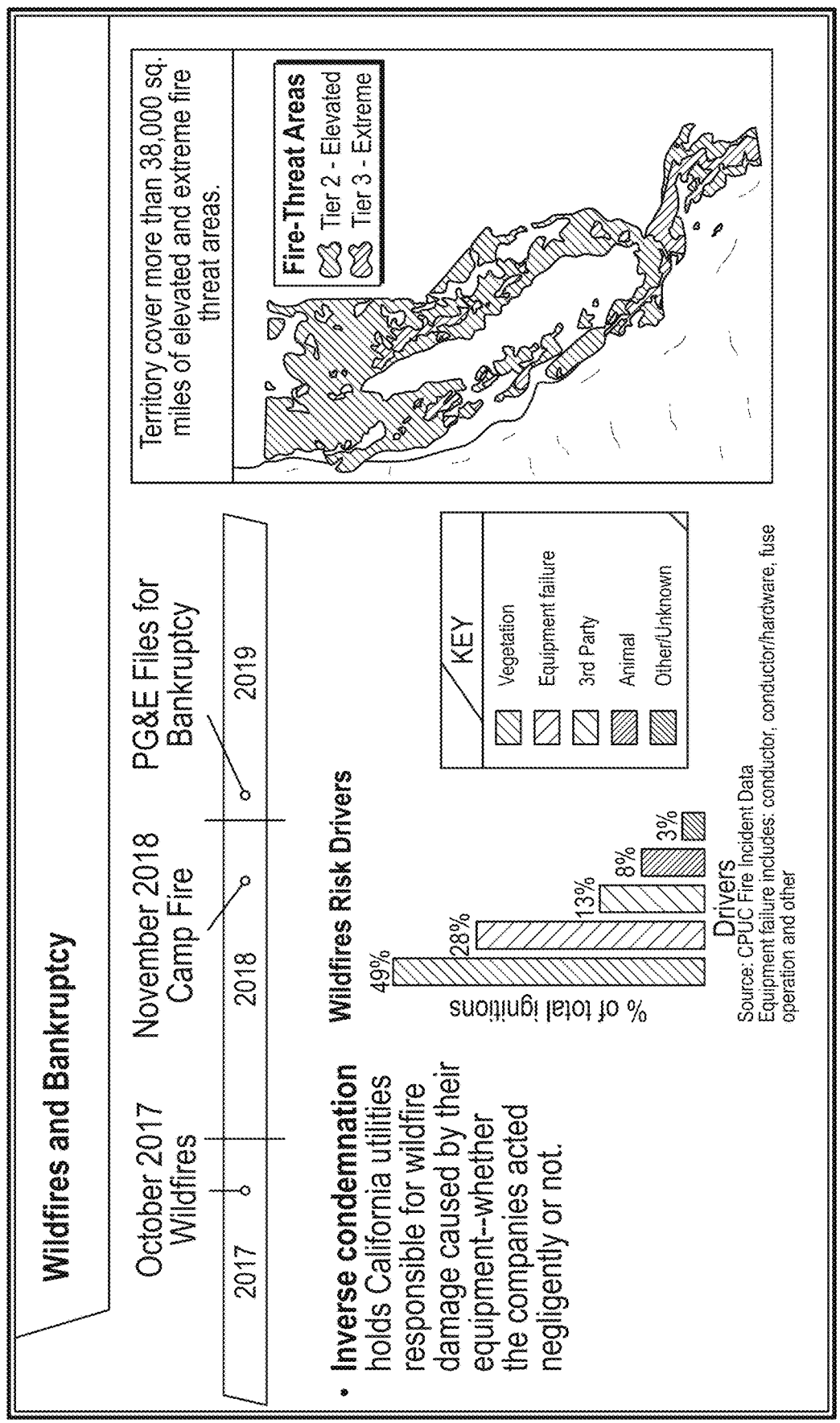
FIG. 27 shows potential liability associated with a non-robust inspection system

FIG. 27 shows the liability that may be associated with a prior art inspection system coupled with certain regulatory and legal environments. In some embodiments, the root cause of the fires comprises vegetation, equipment failure, third party damage and/or sabotage, damage from animals, and/or other unknown causes. In some embodiments, FIG. 27 illustrates the long felt but unmet need of the system described herein.

Figure 28:
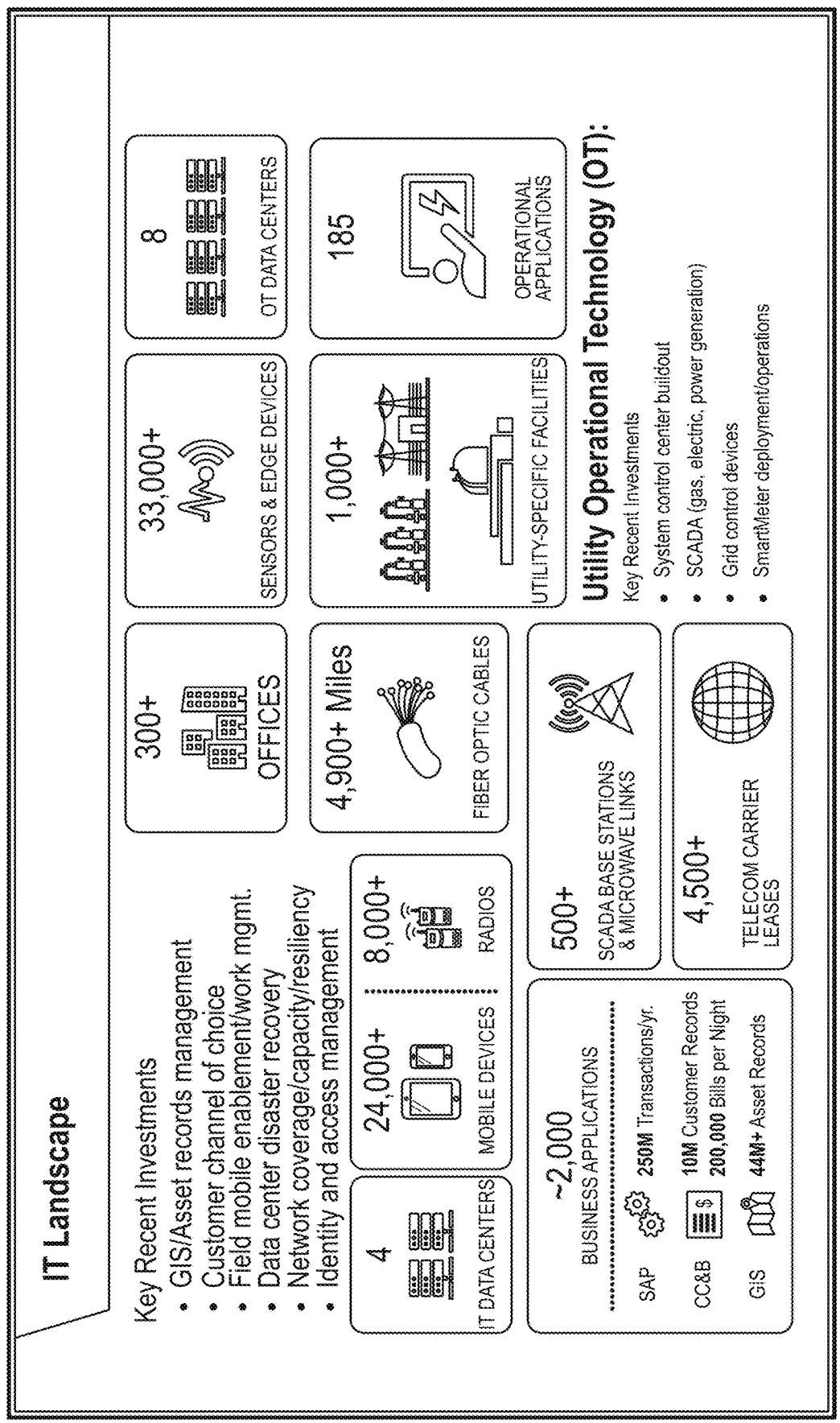
FIG. 28 shows part the infrastructure required to facilitate the creation, transmission, and delivery of electrical power according to some embodiments of the invention.

FIG. 28 shows part the infrastructure required to facilitate the creation, transmission, and delivery of electrical power according to some embodiments of the invention. In some embodiments, the infrastructure comprises GIS/Asset records management, customer channel of choice, field mobile enablement/work mgmt., data center disaster recovery, network coverage/capacity/resiliency, identity and access management. In some embodiment the infrastructure comprises IT data centers, mobile devices, radios business computer applications, offices fiber optic cables, communication infrastructure and leases, sensors and/or edge devices, power plants and support facilities, operational applications, OT data centers, improvement projects, grid control devices, and SmartMeter deployment/operations.

Figure 29:
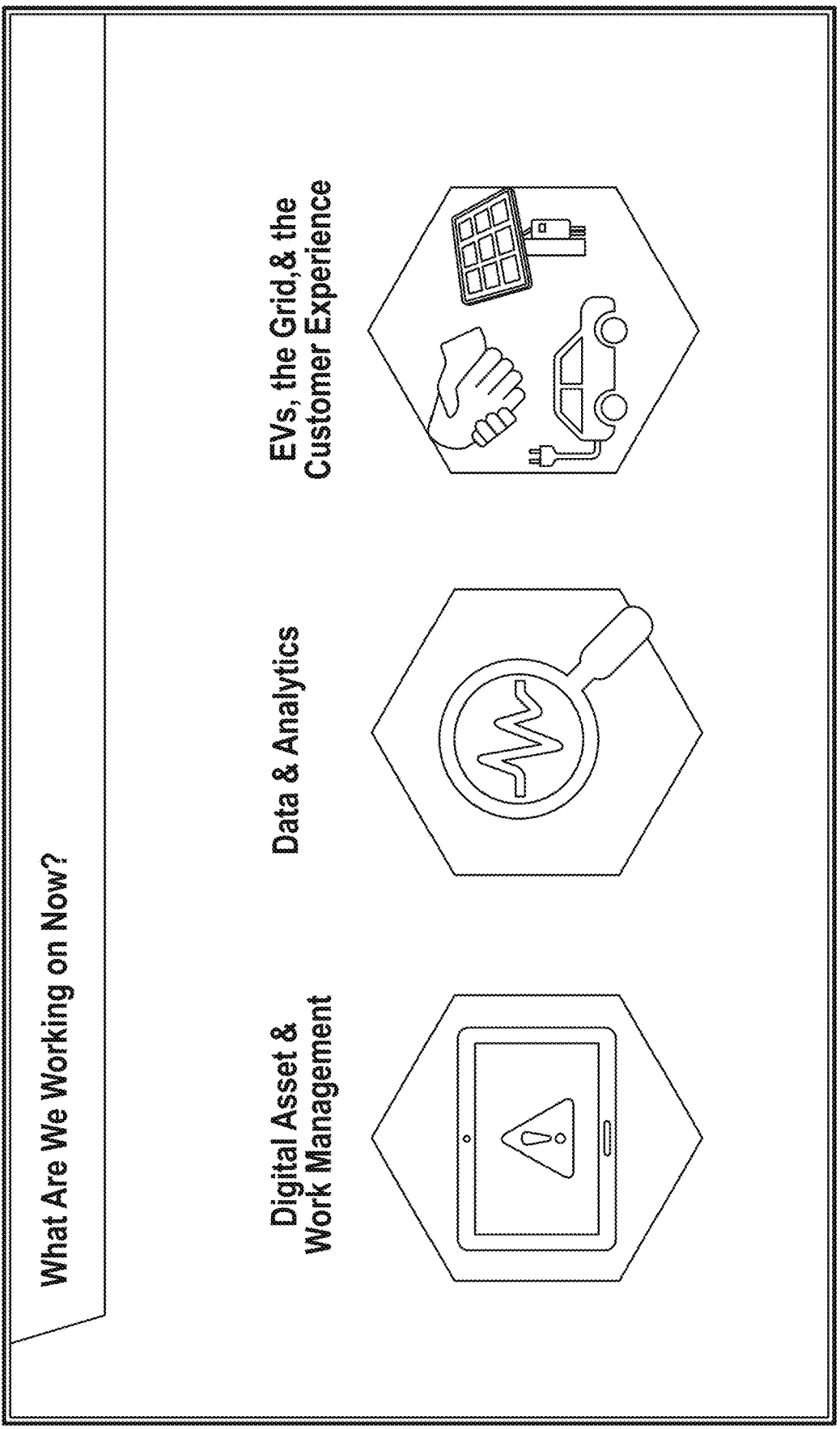
FIG. 29 illustrates some components of the system according to some embodiments

FIG. 29 illustrates some components of the system according to some embodiments. In some embodiments, the system components comprise digital asset and work management, data and analytics, electric vehicles (EVs), the grid, and/or the customer experience.

FIG. 30 illustrates how the system can combine multiple data sources into one centralized system. In some embodiments, the system provides tools that put information at the fingertips of employees to help them work better, smarter, and more safely. In some embodiments, the products are developed in collaboration with users and in partnership with the business. In some embodiments, the need for separate systems is eliminated and all info and tools to get the job done are available from a single operating platform.

FIG. 31 is an overview of the benefits the system provides as pertains to paper in some embodiments. Paper documentation is high risk and is not sustainable in our environment. In some embodiments, digital solutions drive better decisions and more accurate asset & work management information.

Figure 32:
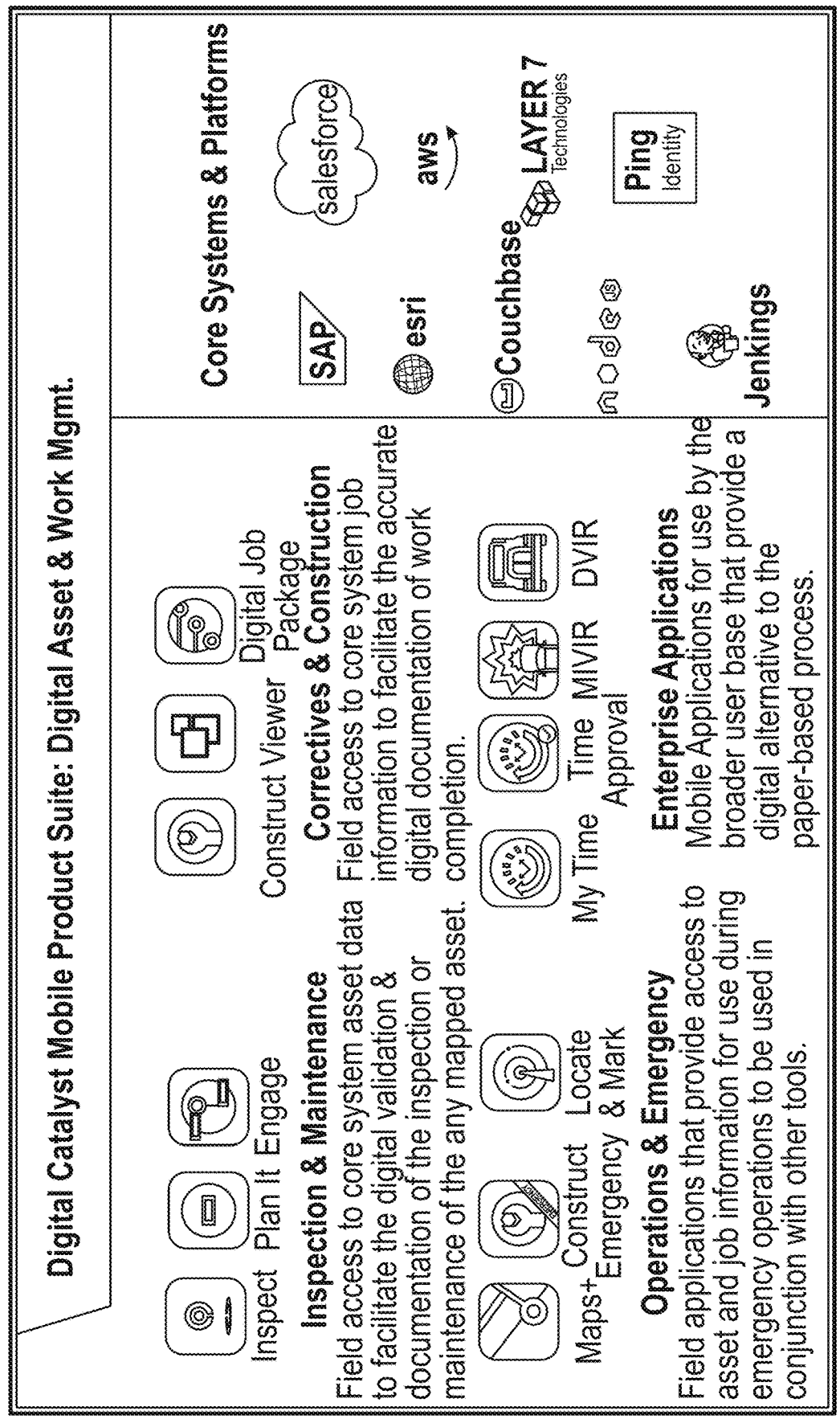
FIG. 32 is an overview of the system capabilities according to some embodiments.

FIG. 32 is an overview of the system capabilities according to some embodiments. In some embodiments, the system comprises capabilities for one or more of inspection and maintenance, operations and emergency, correctives and construction, and/or enterprise applications. In some embodiments, inspection and maintenance comprises field access to core system asset data to facilitate the digital validation & documentation of the inspection or maintenance of any mapped asset. In some embodiments, operations and emergency comprises field applications that provide access to asset and job information for use during emergency operations to be used in conjunction with other tools. In some embodiments, corrective and construction comprises field access to core system job information to facilitate the accurate digital documentation of work completion. In some embodiments, enterprise applications comprise mobile applications for use by the broader user base that provide a digital alternative to the paper-based process. In some embodiments, the system can comprise core systems and platforms such as, but not limited to, one or more of SAP, salesforce, esri, aws, couchbase, layer 7, node, ping identity, and/or Jenkins.

Figure 33:
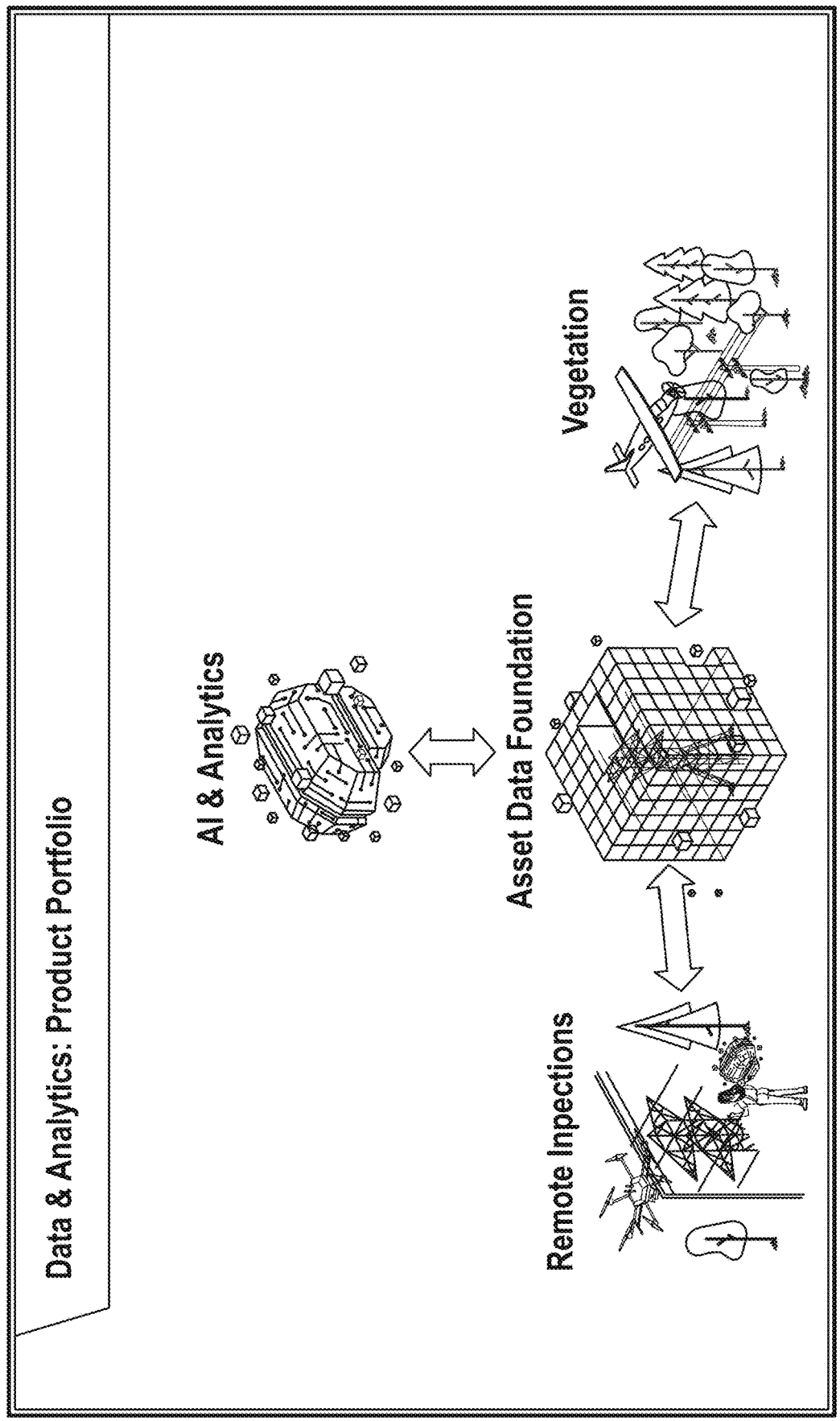
FIG. 33 is an illustration of the integration of data analytics according to some embodiments.

FIG. 33 is an illustration of the integration of data analytics according to some embodiments. In some embodiments, data analytics comprise one or more of AI and analytics, asset data foundation, remote inspections, and vegetation evaluation.

Figure 34:
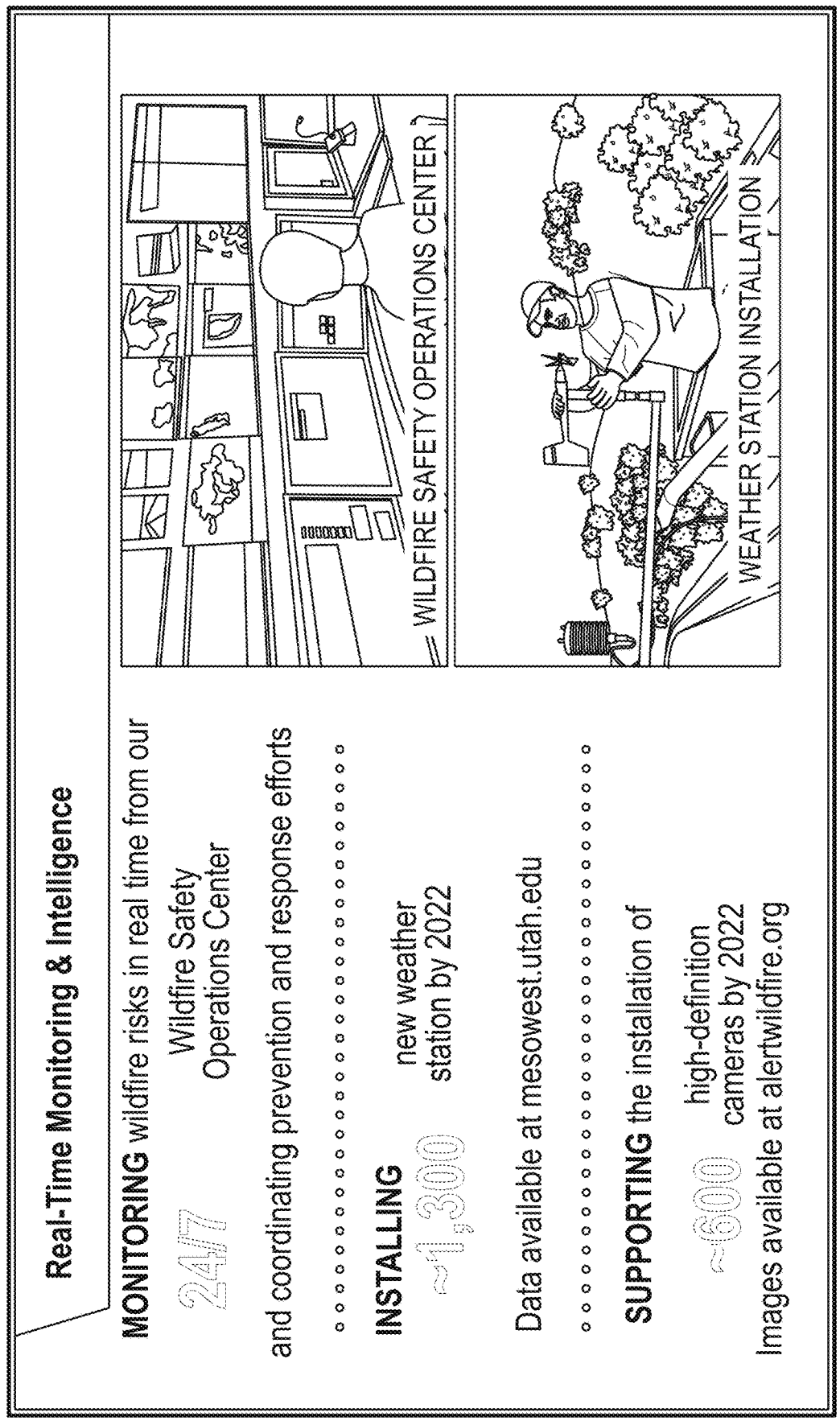
FIG. 34 is an illustration of the real-time monitoring and intelligence the system provides according to some embodiments.

FIG. 34 is an illustration of the real-time monitoring and intelligence the system provides according to some embodiments. In some embodiments, intelligence includes monitoring wildfire risks in real time from a 24/7 wildfire safety operations center and cording prevention and response efforts. In some embodiments, intelligence includes the installation of weather stations. In some embodiments, intelligence comprises the installation of cameras.

FIG. 35 is an overview of the capability of the system as pertains to meteorology, climatology, and fire spread modeling according to some embodiments. In some embodiments, modeling comprises weather and fuels inputs from high resolution historical data. In some embodiments, modeling comprises fire spread simulations. In some embodiments, modeling includes forecasting fire risk and/or fire simulation results at regular time intervals. In some embodiments, modeling comprises identifying high risk areas and/or circuits from a spread perspective. In some embodiments, modeling comprises "what if" and "what could have been" analysis.

Figure 36:
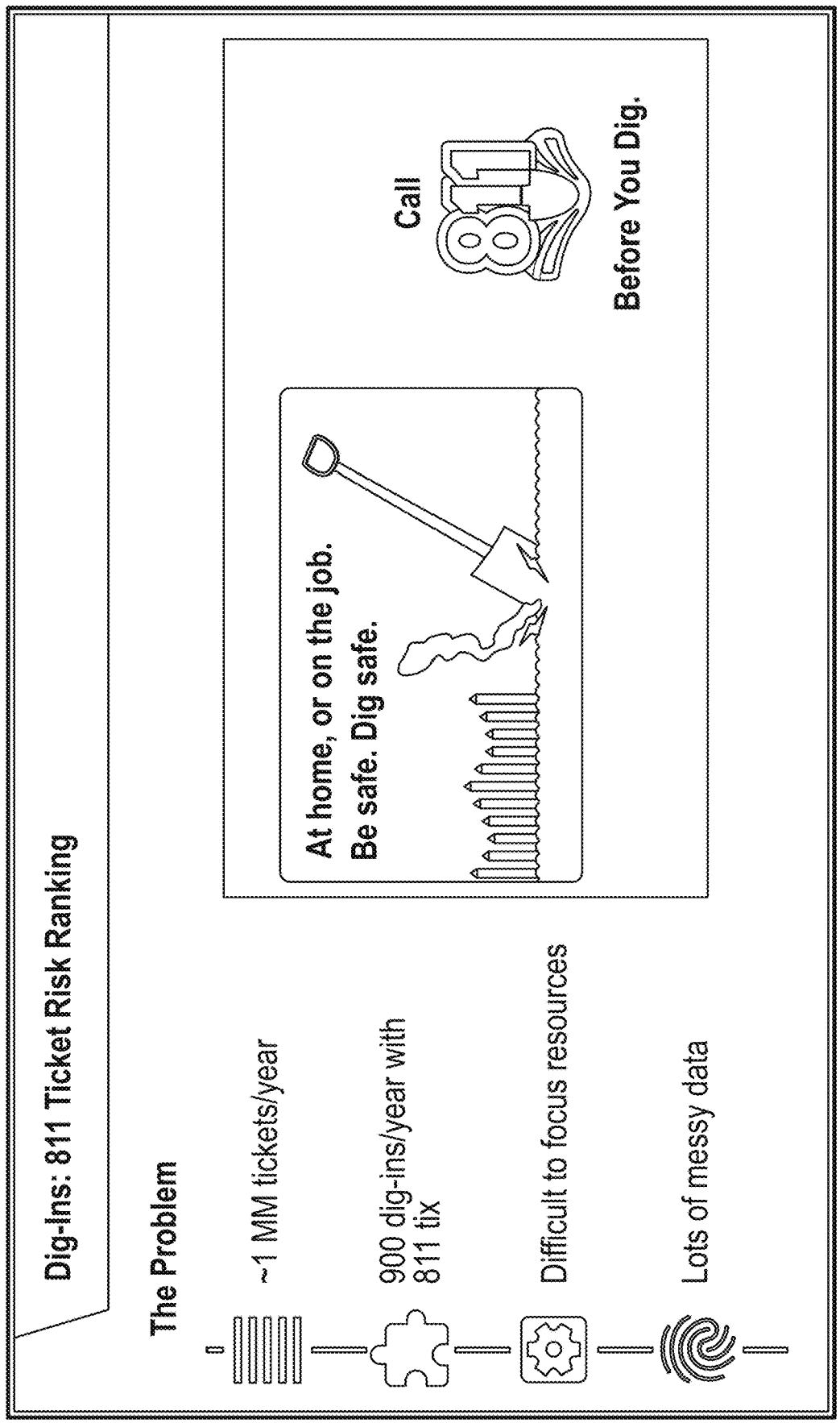
FIG. 36 is a representation of ticket risk ranking according to some embodiments.

FIG. 36 is a representation of ticket risk ranking according to some embodiments. In some embodiments, tickets comprise one or more of over 1 million separate tickets per year; 900 dig-ins per year; limited resources; and/or messing data. In some embodiments, dig-ins comprise digging in the ground in the area of power infrastructure.

Figure 37:
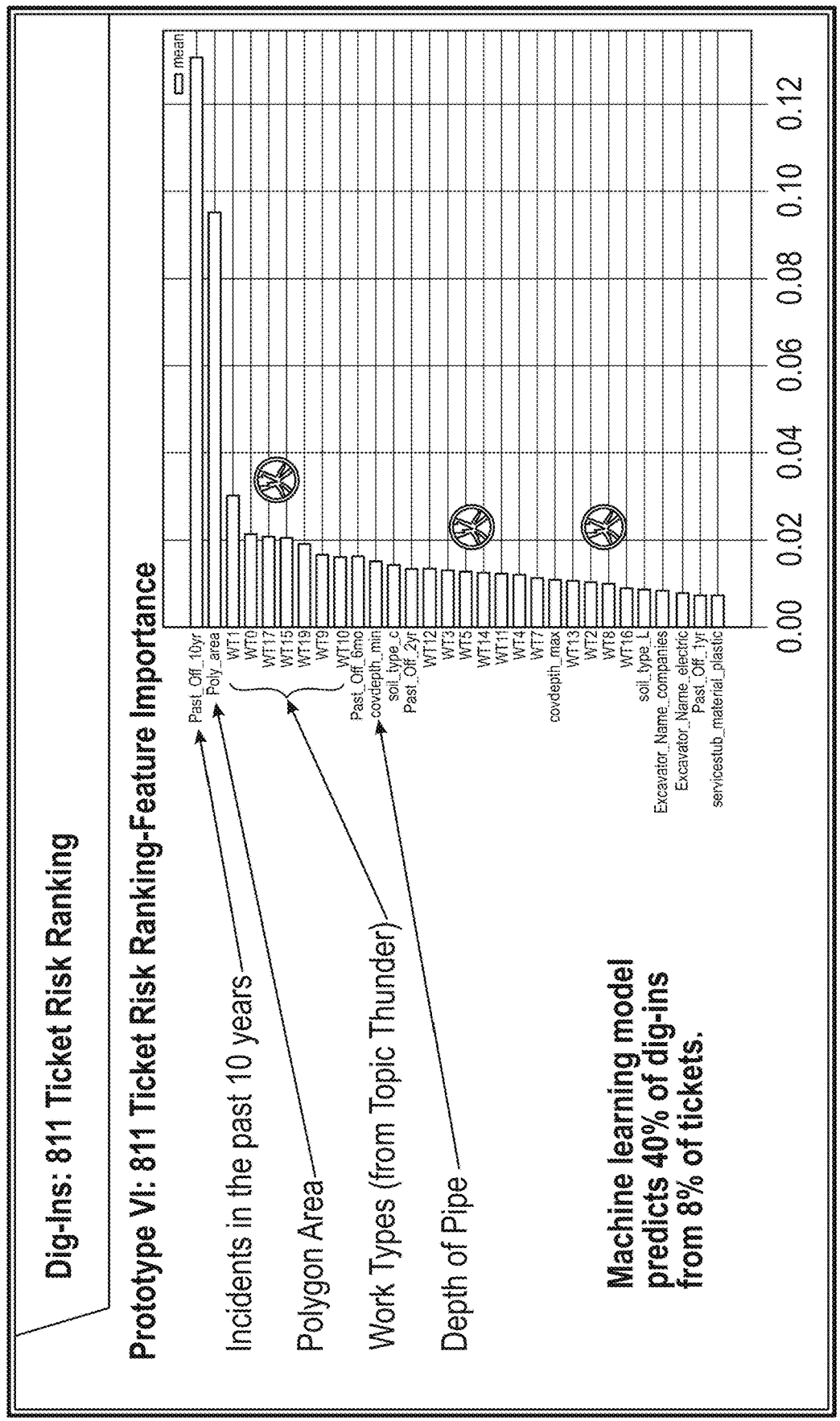
FIG. 37 is a description of the improvement that system machine learning and AI have on ticket risk ranking according to some embodiments.

FIG. 37 is a description of the improvement that system machine learning and AI have on ticket risk ranking according to some embodiments. In some embodiments, machine learning predicts 40% of dig-ins from 8% of tickets.

Figure 38:
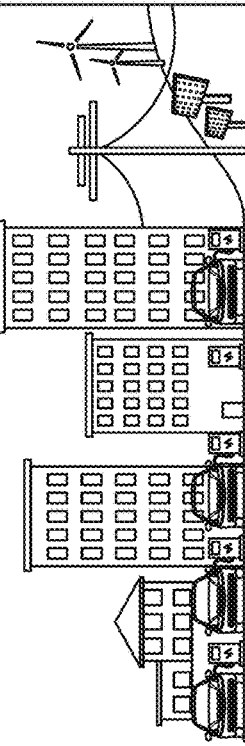
FIG. 38 is a description of the impact that electric vehicles will have on electrical infrastructure according to some embodiments.

FIG. 38 is a description of the impact that electric vehicles will have on electrical infrastructure in the future. EVs will put an ever-increasing demand on the electrical infrastructure which highlights the need for the robust system that the present system provides.

Figure 39:
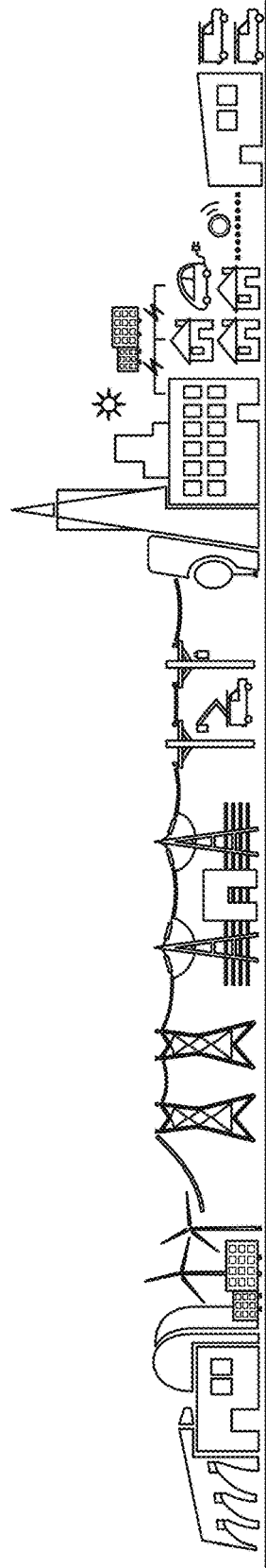
FIG. 39 is an explanation of how the electoral infrastructure is changing according to some embodiments.

FIG. 39 is an explanation changes required to the electrical infrastructure in the future. In some embodiments, the utility business model will transform from energy supplier to grid service provider, with grid operators becoming service orchestrators. In some embodiments, without the capabilities that some embodiments of the present system provide, the ability to keep up with the electrical infrastructure of the future will be impossible to achieve.

Figure 40:
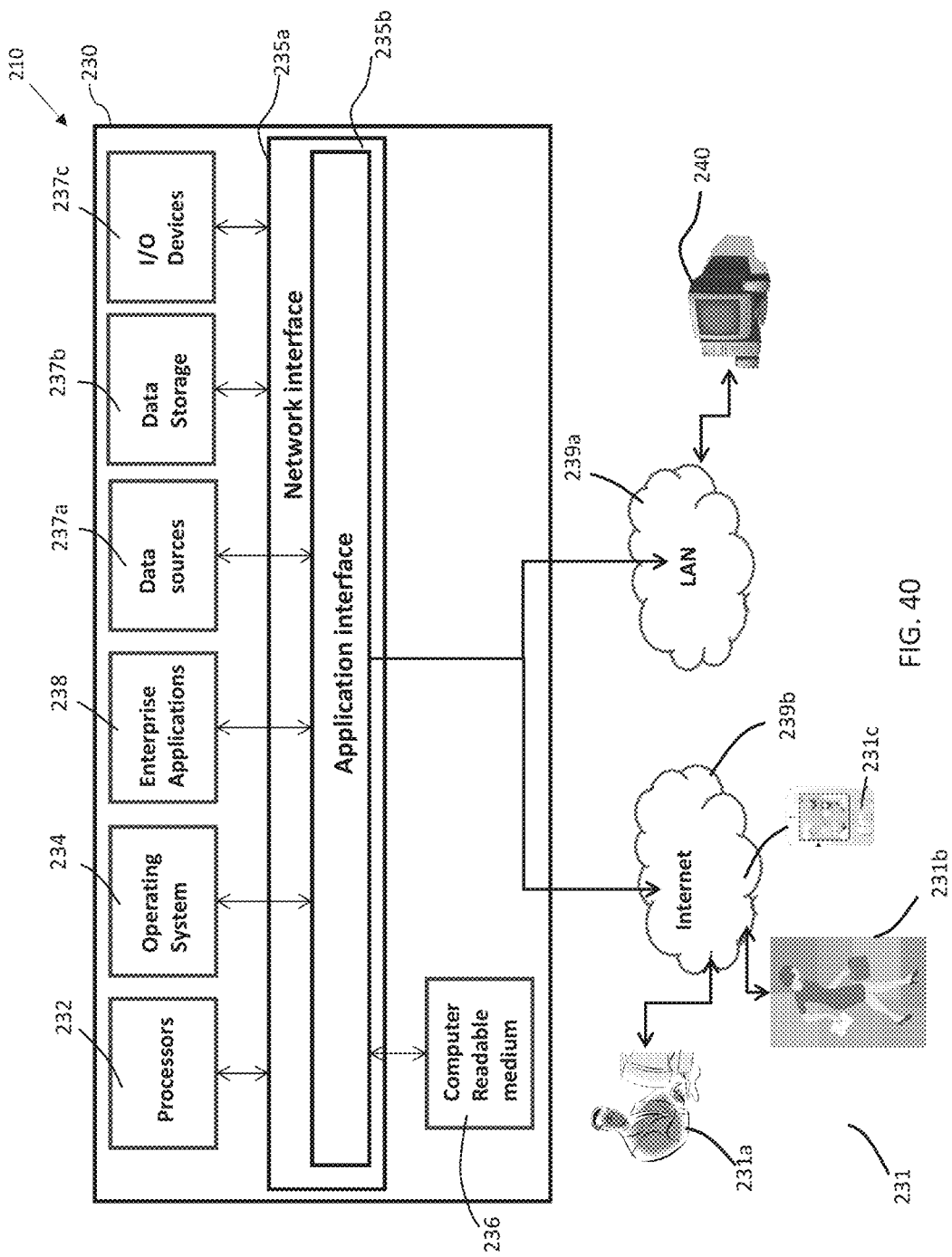
FIG. 40 illustrates a computer system enabling or comprising the systems and methods in accordance with some embodiments of the invention.

FIG. 40 illustrates a computer system 210 enabling or comprising the systems and methods in accordance with some embodiments of the invention. In some embodiments, the computer system 210 can operate and/or process computer-executable code of one or more software modules of the aforementioned system and method. Further, in some embodiments, the computer system 210 can operate and/or display information within one or more graphical user interfaces integrated with or coupled to the system.

In some embodiments, the system 210 can comprise at least one computing device including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 240. Further, in some embodiments, the interfaces 235a, 235b coupled to at least one processor 232 can be configured to process one or more of the software modules (e.g., such as enterprise applications 238). In some embodiments, the software modules 238 can include server-based software, and can operate to host at least one user account and/or at least one client account, and operating to transfer data between one or more of these accounts using the at least one processor 232.

With the above embodiments in mind, it should be understood that the invention can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on computer-readable storage media within the system 210 and on computer-readable storage media coupled to the system 210. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments, of the invention, the system 210 can comprise at least one computer readable medium 236 coupled to at least one data source 237a, and/or at least one data storage device 237b, and/or at least one input/output device 237c. In some embodiments, the invention can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, the computer readable medium 236 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 236 can transmit or carry instructions to a computer 240 and/or at least one user 231, including a router, private or public network, or other transmission device or channel, both wired and wireless. In some embodiments, the software modules 238 can be configured to send and receive data from a database (e.g., from a computer readable medium 236 including data sources 237a and data storage 237b that can comprise a database), and data can be received by the software modules 238 from at least one other source. In some embodiments, at least one of the software modules 238 can be configured within the system to output data to at least one user 231 via at least one graphical user interface rendered on at least one digital display.

In some embodiments, of the invention, the computer readable medium 236 can be distributed over a conventional computer network via the network interface 235a where the system embodied by the computer readable code can be stored and executed in a distributed fashion. For example, In some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240 coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some further embodiments, the user 231 can comprise a mobile user 231b coupled to the system 210. In some embodiments, the user 231b can use any mobile computing device 231c to wireless coupled to the system 210, including, but not limited to, personal digital assistants, and/or cellular phones, mobile phones, or smart phones, and/or pagers, and/or digital tablets, and/or fixed or mobile internet appliances.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Modifications to the illustrated embodiments and the generic principles herein can be applied to all embodiments and applications without departing from embodiments of the system. Also, it is understood that features from some embodiments presented herein are combinable with other features in some embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the additional meaning to the following terms:

"Substantially" and "approximately" when used in conjunction with a value encompass a difference of 10% or less of the same unit and scale of that being measured unless otherwise defined in the specification.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

The use of and/or, in terms of "A and/or B," means one option could be "A and B" and another option could be "A or B." Such an interpretation is consistent with the USPTO Patent Trial and Appeals Board ruling in ex parte Gross, where the Board established that "and/or" means element A alone, element B alone, or elements A and B together.

As used herein, some embodiments recited with term "can" or "may" or derivations there of (e.g., the system display can show X) is for descriptive purposes only and is understood to be synonymous and replaceable with "is configured to" (e.g., the system display is configured to show X) for defining the metes and bounds of the system The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric power grid inspection and management system comprising:
one or more remote controlled drones;
wherein the one or more remote controlled drones are configured to perform inspections on a part of an electrical power grid infrastructure that facilitates one or more of a creation, a transmission, and a delivery of electrical power and transmit inspection results to one more computers;
one or more computers comprising one or more processors and one or more processor readable media, the one or more processor readable media comprising instructions stored thereon that when executed by the one or more processors are configure the one or more computers to:
receive inspection data from the one or more remote controlled drones;
identify one or more electrical grid components that facilitate one or more of the creation, transmission, and delivery of electrical power in the inspection data;
identify one or more electrical grid component defects; and
display one or more images identifying the one or more electrical grid component defects on one or more graphical user interfaces;
wherein identifying one or more electrical grid component defects in the inspection data includes identifying one or more defects in the one or more electrical grid components that facilitate one or more of the creation, transmission, and delivery of electrical power; and
wherein the one or more computers are further configured to automatically provide a description of one or more defect issues associated with the one or more electrical grid components in the inspection data.

2. The electric power grid inspection and management system of claim 1,
wherein the description includes one or more of an image file name, an electrical grid component description, an electrical grid component structure label, an electrical grid component equipment identification, and/or an electrical grid component geographical position of the one or more electrical grid components in the inspection data.

3. The electric power grid inspection and management system of claim 1,
wherein an artificial intelligence is used to automatically provide the description; and wherein automatically providing the description includes the artificial intelligence using model training data.

4. The electric power grid inspection and management system of claim 3,
wherein the model training data comprises one or more electrical grid component images and/or descriptions including one or more of heart rot, damaged conductors, insulators, overgrown vegetation, and/or hooks.

5. An electric power grid inspection and management system comprising:
one or more autonomous drones;
wherein the one or more autonomous drones are configured to perform one or more autonomous inspections on a part of an electrical power grid infrastructure that facilitates one or more of a creation, a transmission, and a delivery of electrical power and transmit autonomous inspection data obtained during the one or more autonomous inspections to one more computers;
one or more computers comprising one or more processors and one or more processor readable media, the one or more processor readable media comprising instructions stored thereon that when executed by the one or more processors configure the one or more computers to:
receive the autonomous inspection data from the one or more autonomous drones;
create a monitoring model using the autonomous inspection data;
display the monitoring model on one or more graphical user interfaces;
wherein identifying one or more electrical grid component defects in the inspection data includes identifying one or more defects in the one or more electrical grid components that facilitate one or more of the creation, transmission, and delivery of electrical power; and
wherein the one or more computers are further configured to automatically provide a description of one or more defect issues associated with the one or more electrical grid components in the inspection data.

6. The electric power grid inspection and management system of claim 5,
wherein the monitoring model includes one or more of electrical grid component detection, electrical grid component failure mode detection, electrical grid component failure prediction, and/or electrical grid component bias detection.

7. The electric power grid inspection and management system of claim 5,
wherein the monitoring model includes one or more of electrical grid component labelled images, electrical grid component correctives, and/or electrical grid component inspection history.

8. The electric power grid inspection and management system of claim 5,
wherein the one or more computers are further configured to provide a list and/or description of defect issues associated with an electrical power grid structure.

9. The electric power grid inspection and management system of claim 8,
wherein an artificial intelligence is used to automatically provide the monitoring model; and
wherein the one or more computers are further configured to enable a user to associate a non-identified defect issue within the monitoring model to train the artificial intelligence.

10. The electric power grid inspection and management system of claim 9,
wherein the monitoring model includes one or more of an electrical grid component image file name, an electrical grid component structure description, an electrical grid component structure label, an electrical grid component equipment ID, and/or an electrical grid component position.

11. The electric power grid inspection and management system of claim 5,
wherein the monitoring model comprises structural reporting on the part of the electrical power grid infrastructure that facilitates one or more of the creation, the transmission, and the delivery of electrical power; and wherein structural reporting comprises one or more of defect electrical grid component evaluation, identifying defects within an electrical grid component image, and/or auto populating and formatting forms and/or documentation associated with one or more electrical grid components; and wherein the structural reporting is provided automatically by artificial intelligence.

12. The electric power grid inspection and management system of claim 11, wherein the structural reporting comprises one or more of a labeling, a setting viewing area, an auto flagging, a quality assurance, a prioritization, a history, and/or a feedback.

13. The electric power grid inspection and management system of claim 12, wherein the labeling comprises labeling one or more electrical grid component forms and/or one or more electrical grid component pictures automatically.

14. The electric power grid inspection and management system of claim 12, wherein the setting viewing area comprises setting a cone of vision or a portion of the one or more electrical grid components.

15. The electric power grid inspection and management system of claim 12, wherein the auto flagging comprises automatically flagging electrical grid components and displaying results of the auto flagging.

16. The electric power grid inspection and management system of claim 12, wherein the prioritization comprises prioritizing one or more high-risk electrical grid component assets.

17. The electric power grid inspection and management system of claim 12, wherein the history comprises inspection information including one or more of an electrical grid component structure asset name, an electrical grid component inspection person name, and/or an electrical grid component tag name.

18. The electric power grid inspection and management system of claim 12, wherein the feedback comprises supplying corrective information to one or more of drone pilots, inspectors, management, vendors, office employees, field employees and/or the artificial intelligence.

* * * * *